(12) United States Patent
Ori et al.

(10) Patent No.: US 10,197,893 B2
(45) Date of Patent: Feb. 5, 2019

(54) REAR CONVERTER LENS AND IMAGING APPARATUS

(71) Applicant: FUJIFILM Corporation, Tokyo (JP)

(72) Inventors: Tetsuya Ori, Saitama (JP); Michio Cho, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 36 days.

(21) Appl. No.: 15/428,169

(22) Filed: Feb. 9, 2017

(65) Prior Publication Data

US 2017/0277022 A1    Sep. 28, 2017

(30) Foreign Application Priority Data

Mar. 25, 2016  (JP) .................. 2016-061659

(51) Int. Cl.
| | |
|---|---|
| *G03B 17/56* | (2006.01) |
| *G02B 9/52* | (2006.01) |
| *G02B 9/54* | (2006.01) |
| *G02B 15/10* | (2006.01) |

(52) U.S. Cl.
CPC ............ *G03B 17/565* (2013.01); *G02B 9/52* (2013.01); *G02B 9/54* (2013.01); *G02B 15/10* (2013.01)

(58) Field of Classification Search
CPC .......... G03B 17/565; G02B 9/52; G02B 9/54; G02B 15/10
USPC ........................................... 359/675
See application file for complete search history.

(56) References Cited

U.S. PATENT DOCUMENTS

2016/0274443 A1\* 9/2016 Ogata .................. G03B 17/14

FOREIGN PATENT DOCUMENTS

JP    2012-047869 A    3/2012

\* cited by examiner

*Primary Examiner* — Jie Lei
*Assistant Examiner* — Mitchell Oestreich
(74) *Attorney, Agent, or Firm* — Studebaker & Brackett PC

(57) ABSTRACT

Provided are a rear converter lens and an imaging apparatus capable of achieving favorable optical performance and an appropriate back focal length with high magnification. The rear converter lens RCL consists of, in order from the object side, four lens-groups of positive, negative, negative, and positive lens-groups. In order from the object side, a first lens-group RG1 consists of a negative lens RL11 and a positive lens RL12, a second lens-group RG2 consists of a negative lens RL21 and a positive lens RL22, a third lens-group RG3 consists of a negative lens RL31, a positive lens RL32, and a negative lens RL33, and a fourth lens-group RG4 consists of a biconvex lens RL41 and a negative lens RL42. Here, $0.22 < cf/f12 < 1$ is satisfied, where $f12$ is a composite focal length of the first lens-group RG1 and the second lens-group RG2, and $cf$ is a focal length of the rear converter lens RCL.

20 Claims, 12 Drawing Sheets

EXAMPLE 1

EXAMPLE 3

EXAMPLE 4

EXAMPLE 1

EXAMPLE 1

REAR CONVERTER LENS AND IMAGING APPARATUS

CROSS-REFERENCE TO RELATED APPLICATIONS

The present application claims priority under 35 U.S.C. § 119 to Japanese Patent Application No. 2016-061659, filed on Mar. 25, 2016. Each of the above application(s) is hereby expressly incorporated by reference, in its entirety, into the present application.

BACKGROUND OF THE INVENTION

1. Field of the Invention

The present invention relates to a rear converter lens, which is detachably and attachably mounted on the image side of a master lens and in which a focal length of the whole system is increased, and an imaging apparatus comprising the rear converter lens.

2. Description of the Related Art

Conventionally, there are known rear converter lenses (rear conversion lenses) each of which is detachably and attachably mounted on a master lens (main lens) between a camera main body and the master lens and serves as an optical system in which a focal length of the whole lens system is increased. For example, JP2012-47869A discloses an optical system in which a master lens is equipped with a rear converter lens configured to have four groups including: a first lens group that has a positive refractive power; a second lens group that has a negative refractive power; a third lens group that has a negative refractive power; and a fourth lens group that has a positive refractive power.

SUMMARY OF THE INVENTION

However, in recent years, attention has been focused on non-reflex cameras having no optical finders. For such an optical system for a non-reflex camera, there has been a demand to achieve a back focal length which is shorter than that of an optical system for a conventional single-lens reflex camera. Hence, for the rear converter lens for the non-reflex camera, in addition to achieving an optical performance and a magnification of a synthetic optical system in which a rear converter lens is mounted on a master lens, there has been a demand to suppress an increase in back focal length of the synthetic optical system in order to avoid an increase in lens total length of the synthetic optical system while maintaining the back focal length of the synthetic optical system in a range in which the rear converter lens can be mounted.

The optical system disclosed in JP2012-47869A is an optical system for a single-lens reflex camera, and thus the optical system cannot satisfactorily deal with the demand. For example, if the rear converter lens is mounted on a master lens for a non-reflex camera having a back focal length shorter than that of the single-lens reflex camera without an increase and a decrease in the size of the rear converter lens disclosed in JP2012-47869A, it is necessary for a position of the rear converter lens on the optical axis to be set to be closer to the image side than a position at a distance from the imaging plane of the master lens assumed in JP2012-47869A. However, in this case, in the rear converter lenses of all examples of JP2012-47869A, a magnification thereof becomes lower than a magnification assumed in JP2012-47869A, and it becomes difficult to achieve a desired magnification.

Further, in a case where the rear converter lens disclosed in JP2012-47869A is mounted on the master lens for the non-reflex camera, it becomes difficult to sufficiently ensure a back focal length of a synthetic optical system as compared with the case where the rear converter lens is mounted on the master lens of the single-lens reflex camera.

Furthermore, if the optical system disclosed in JP2012-47869A as the optical system for the non-reflex camera is intended to be standardized and applied on the basis of an image height, a problem such as deficiency of the magnification, excessive deficiency of the back focal length, or impossibility of achieving desired optical performance occurs.

The present invention has been made in consideration of the problem, and its object is to provide a rear converter lens, which has favorable optical performance with high magnification and is capable of achieving an appropriate back focal length compatible with a non-reflex camera, and an imaging apparatus comprising the rear converter lens.

According to the present invention, there is provided a rear converter lens that is mounted on an image side of a master lens and has a negative focal length such that a focal length of a whole system thereof is longer than a focal length of the master lens alone. The rear converter lens consists of, in order from the object side, the following four lens groups: a first lens group that has a positive refractive power; a second lens group that has a negative refractive power; a third lens group that has a negative refractive power; and a fourth lens group that has a positive refractive power. The first lens group consists of, in order from the object side, a first lens group first lens which is a negative lens concave toward the image side, and a first lens group second lens which is a positive lens convex toward the object side. The second lens group consists of, in order from the object side, a second lens group first lens which is a negative lens concave toward the image side, and a second lens group second lens which is a positive lens convex toward the object side. The third lens group consists of, in order from the object side, a third lens group first lens which is a negative lens concave toward the object side, a third lens group second lens which is a positive lens convex toward the image side, and a third lens group third lens which is a negative lens concave toward the object side. The fourth lens group consists of, in order from the object side, a fourth lens group first lens which is a biconvex lens, and a fourth lens group second lens which is a negative lens concave toward the object side. With such a configuration, the following conditional expression (1) is satisfied.

$$0.22 < cf/f12 < 1 \quad (1)$$

Here, cf is a focal length of the entire rear converter lens, and f12 is a composite focal length of the first lens group and the second lens group.

In the rear converter lens of the present invention, it is preferable that any one of the following conditional expressions (2) to (5), (7) to (10), (1-1) to (5-1), (7-1), and (8-1) is further satisfied, or arbitrary combination thereof is satisfied. Further, in a case where the conditional expression (5) or (5-1) is satisfied, it is preferable that the conditional expression (6) or (6-1) is satisfied.

$$0.24 < cf/f12 < 0.85 \quad (1\text{-}1)$$

$$0.2 < Nnave - Npave < 0.5 \quad (2)$$

$$0.22 < Nnave - Npave < 0.4 \quad (2\text{-}1)$$

$$0.08 < -\Sigma air/cf < 0.14 \quad (3)$$

$$0.1 < -\Sigma air/cf < 0.135 \quad (3\text{-}1)$$

$$-0.25 < f3/f3a < 1.0 \quad (4)$$

$$0 < f3/f3a < 0.5 \quad (4\text{-}1)$$

$$-0.55 < (1/f12 - 1/f34) \times cf < 0.6 \quad (5)$$

$$-0.5 < (1/f12 - 1/f34) \times cf < 0.5 \quad (5\text{-}1)$$

$$0.98 < (1/f12 + 1/f34) \times cf < 1.2 \quad (6)$$

$$1 < (1/f12 + 1/f34) \times cf < 1.15 \quad (6\text{-}1)$$

$$0.3 < f34/f12 < 4 \quad (7)$$

$$0.32 < f34/f12 < 3.5 \quad (7\text{-}1)$$

$$0.7 < (G3r + G3f)/(G3r - G3f) < 3 \quad (8)$$

$$0.9 < (G3r + G3f)/(G3r - G3f) < 2.5 \quad (8\text{-}1)$$

$$0.7 < (R33r + R33f)/(R33r - R33f) < 2 \quad (9)$$

$$-0.46 < IH/cf < -0.3 \quad (10)$$

Here, cf is a focal length of the entire rear converter lens, f12 is a composite focal length of the first lens group and the second lens group, Nnave is an average value of refractive indexes of all the negative lenses included in the rear converter lens at a d-line, Npave is an average value of refractive indexes of all the positive lenses included in the rear converter lens at the d-line, $\Sigma$air is the sum of air distances among surface distances on an optical axis included in the rear converter lens, f3a is a composite focal length of the third lens group first lens and the third lens group second lens, f3 is a focal length of the third lens group, f34 is a composite focal length of the third lens group and the fourth lens group, G3r is a paraxial radius of curvature of a most image side surface in the third lens group, G3f is a paraxial radius of curvature of a most object side surface of the third lens group, R33r is a paraxial radius of curvature of an image side surface of the third lens group third lens, R33f is a paraxial radius of curvature of an object side surface of the third lens group third lens, and IH is a maximum image height.

In the rear converter lens of the present invention, it is preferable that the third lens group third lens has a meniscus shape.

An imaging apparatus of the present invention comprises the rear converter lens of the present invention.

It should be noted that a term "substantially includes, ~" means that the imaging lens may include not only the exemplified elements but also lenses substantially having no powers, optical elements, which are not lenses, such as a diaphragm, a mask, a cover glass, and a filter, and mechanism parts such as a lens flange, a lens barrel, an imaging element, and a hand shaking correction mechanism. Further, reference signs of surface shapes and refractive powers of the lenses are assumed as those in paraxial regions in a case where some lenses have aspheric surfaces.

According to the present invention, it is possible to provide a rear converter lens, which has favorable optical performance with high magnification and is capable of achieving an appropriate back focal length, and an imaging apparatus comprising the related rear converter lens.

DESCRIPTION OF THE PREFERRED EMBODIMENTS

Figure 1:
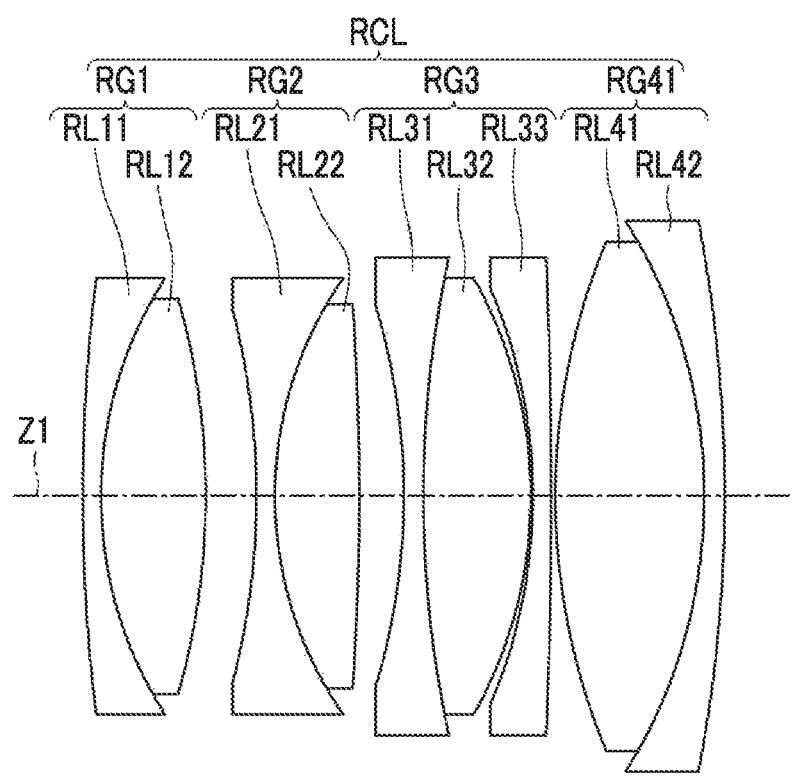
FIG. 1 is a lens cross-sectional view illustrating a first configuration example of a rear converter lens according to an embodiment of the present invention, as Example 1.
Figure 2:
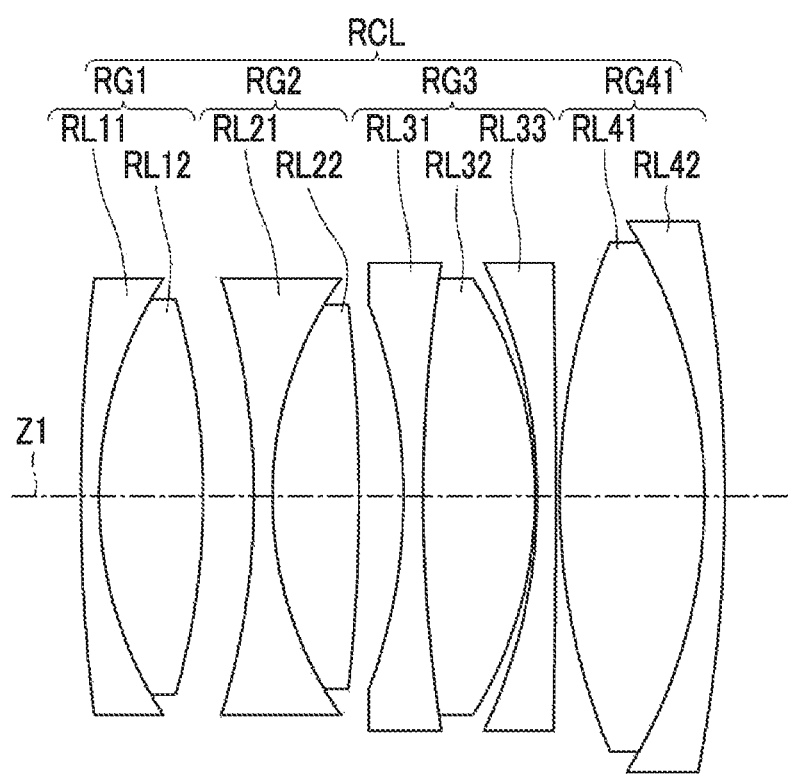
FIG. 2 is a lens cross-sectional view illustrating a second configuration example of the rear converter lens according to the embodiment of the present invention, as Example 2.
Figure 3:
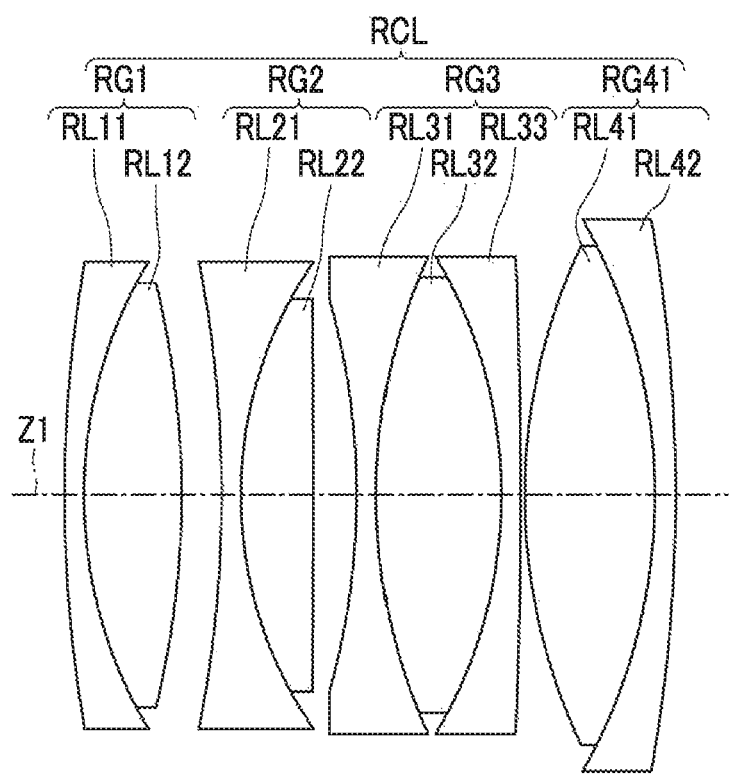
FIG. 3 is a lens cross-sectional view illustrating a third configuration example of the rear converter lens according to the embodiment of the present invention, as Example 3.
Figure 4:
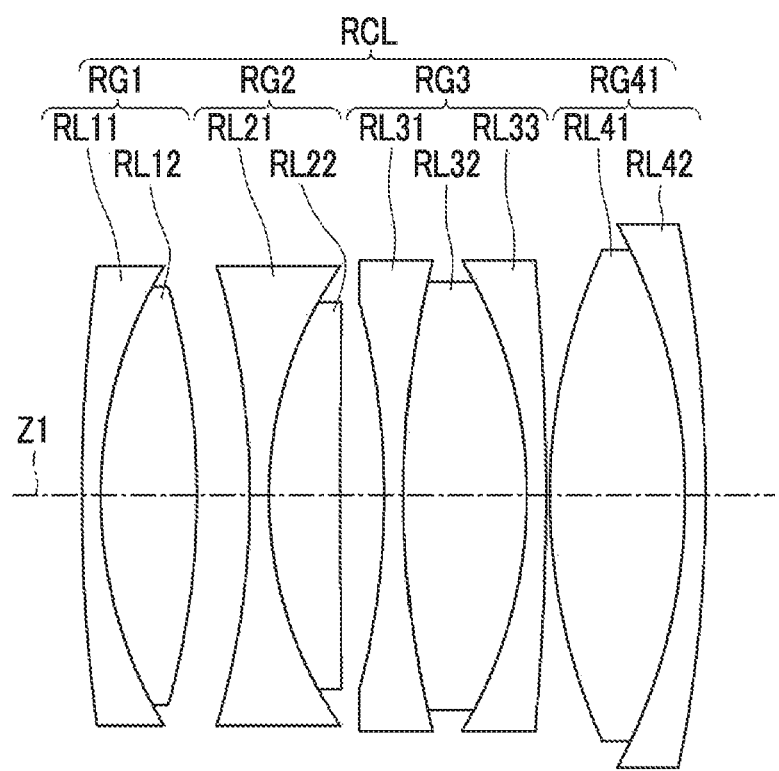
FIG. 4 is a lens cross-sectional view illustrating a fourth configuration example of the rear converter lens according to the embodiment of the present invention, as Example 4.
Figure 5:
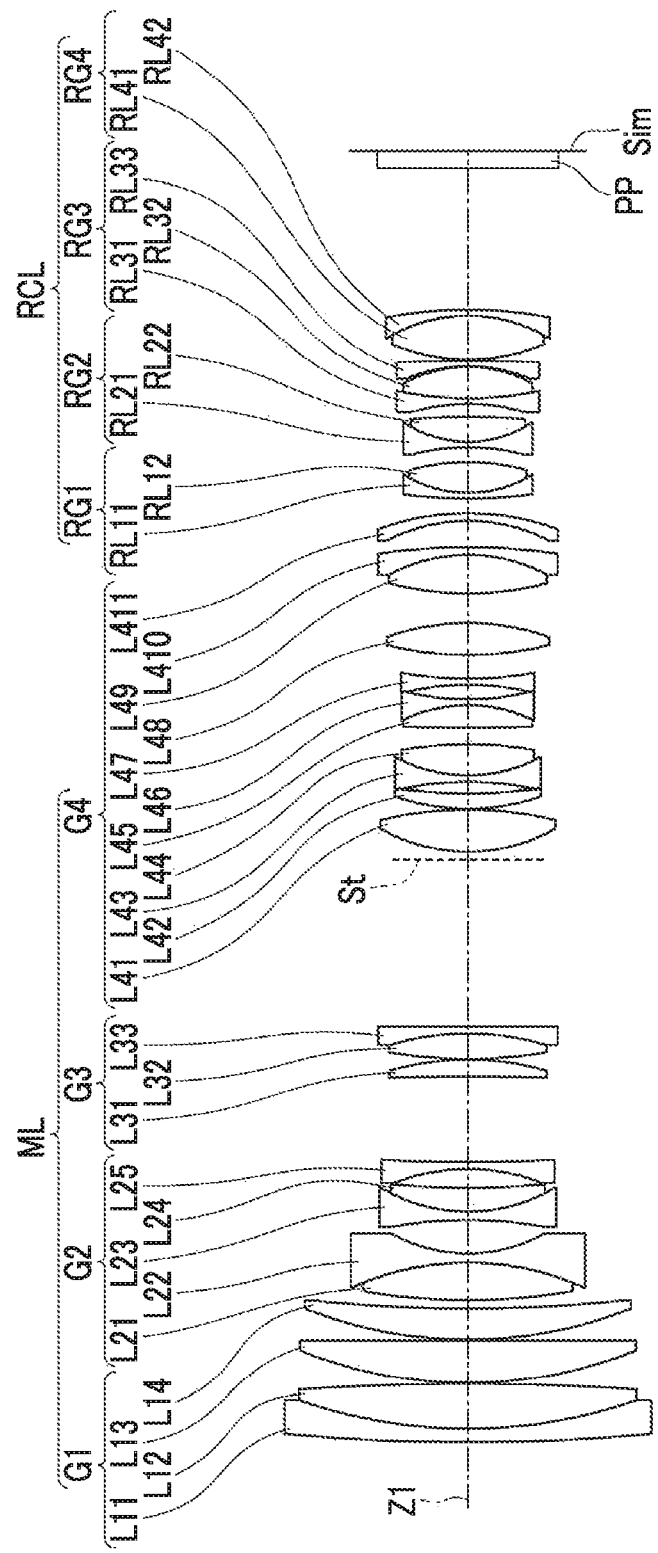
FIG. 5 is a lens cross-sectional view illustrating an overall configuration in a state where the rear converter lens of FIG. 1 is mounted on a master lens.
Figure 6:
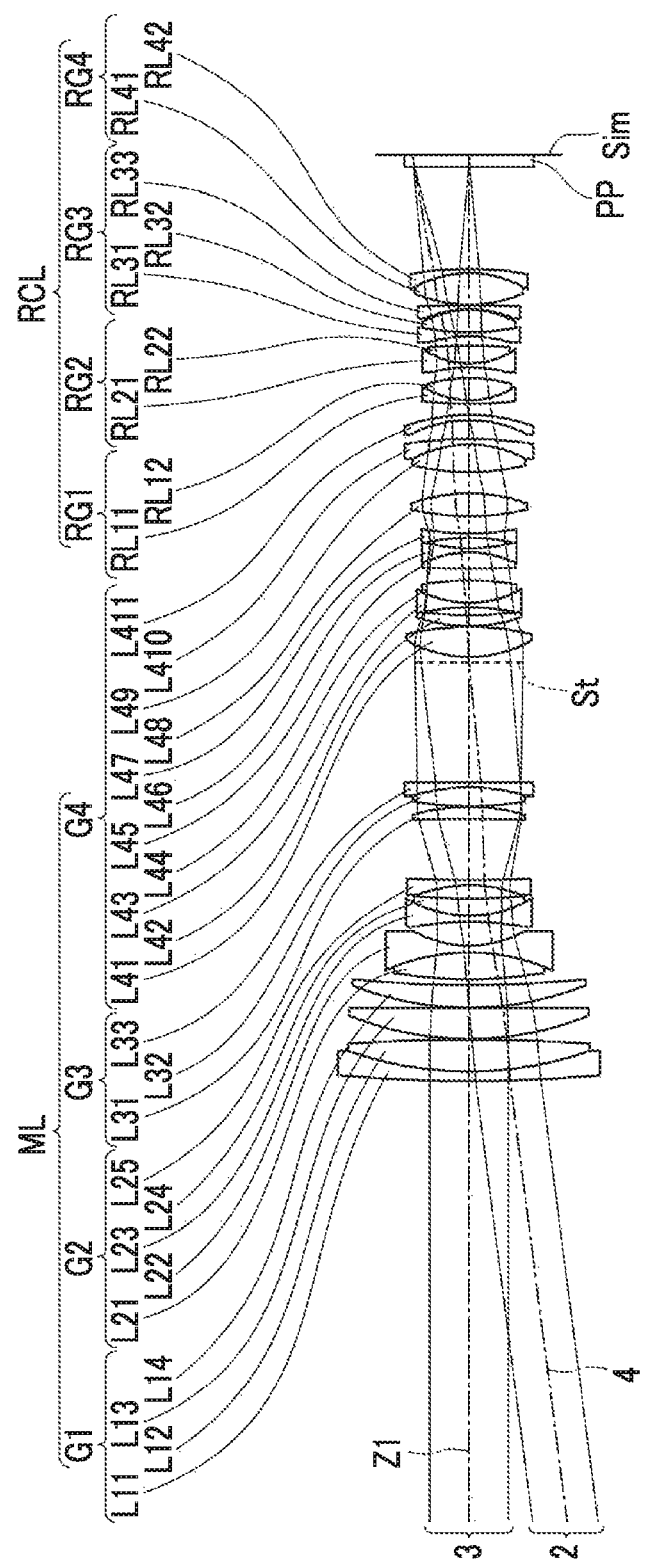
FIG. 6 is a ray diagram of an optical system shown in FIG. 5.

Hereinafter, an embodiment of the present invention will be described with reference to drawings. FIGS. 1 to 4 are cross-sectional views respectively illustrating first to fourth lens configuration examples of a rear converter lens RCL according to the embodiment of the present invention. In FIGS. 2 to 4, all basic configurations of the respective configuration examples are the same. Thus, hereinafter, description will be given on the basis of the configuration example shown in FIG. 1, and the configuration examples of FIGS. 2 to 4 will be also described as necessary. FIG. 5 is a lens cross-sectional view illustrating an overall configuration in a state where the rear converter lens RCL of FIG. 1 is mounted on a master lens ML. FIG. 6 is a ray diagram of an optical system shown in FIG. 5, and shows each optical path of on-axis rays 3 and rays 2 with the maximum angle of view in a state where an infinite object is in focus. In the rays 2 with the maximum angle of view, a principal ray 4 with maximum angle of view is indicated by the chain line. In addition, in FIGS. 1 to 6, the left side is the object side, and the right side is the image side.

The rear converter lens RCL is detachably and attachably mounted on the image side of the master lens ML. Further, the rear converter lens RCL is mounted on the image side of the master lens ML, and has a negative focal length such that a focal length of the whole system is set to be longer than a focal length of the master lens alone. Hereinafter, a synthetic optical system (whole system), in which the rear converter lens RCL is mounted on the master lens ML, is simply referred to as a synthetic optical system.

As shown in FIGS. 1 and 2, the rear converter lens RCL includes, in order from the object side along the optical axis Z: a first lens group RG1 that has a positive refractive power; a second lens group RG2 that has a negative refractive power; a third lens group RG3 that has a negative refractive power; and a fourth lens group RG4 that has a positive refractive power. The first lens group RG1, the second lens group RG2, the third lens group RG3, and the fourth lens group RG4 are arranged to respectively have positive, negative, negative, positive powers in order from the object side. Thereby, it is possible to suppress change in curvature of field and spherical aberration caused by mounting of the rear converter lens RCL. In particular, by sharing negative refractive powers between the two lens groups including the second lens group RG2 and the third lens group RG3, it is possible to suppress change in longitudinal chromatic aberration caused by mounting of the rear converter lens RCL.

A composite refractive power of the first lens group RG1 and the second lens group RG2 is negative. Thereby, an object side principal point of the rear converter lens RCL can be set to be close to the object side, and it is possible to achieve a desired zoom ratio without excessively increasing the negative refractive power of the rear converter lens RCL. As a result, this configuration is advantageous in suppressing occurrence of the curvature of field.

Hereinafter, the first lens group RG1 included in the rear converter lens RCL, the second lens group RG2 included in the rear converter lens RCL, the third lens group RG3 included in the rear converter lens RCL, and the fourth lens group RG4 included in the rear converter lens RCL are respectively simply referred to as the first lens group RG1, the second lens group RG2, the third lens group RG3, and the fourth lens group RG4.

The first lens group RG1 substantially includes, in order from the object side, a first lens group first lens RL11 that is a negative lens concave toward the image side, and a first lens group second lens RL12 that is a positive lens convex toward the object side.

In this case, the first lens group first lens RL11 and the first lens group second lens RL12 may be respectively formed as single lenses. In this case, it is possible to appropriately correct spherical aberration due to an effect of an air lens between an image side concave surface of the first lens group first lens RL11 as a negative lens and an object side convex surface of the first lens group second lens RL12. Further, the first lens group RG1 may be formed of one set of cemented lenses in which the first lens group first lens RL11 and the first lens group second lens RL12 are cemented. In this case, even if an absolute value of a radius of curvature of a cemented surface is set to be small, it is possible to suppress occurrence of high-order aberrations. Thus, this configuration is advantageous in correcting the curvature of field, and it is possible to suppress fluctuation in longitudinal chromatic aberration caused by mounting of the rear converter lens RCL. Further, since the first lens group RG1 is formed of one set of cemented lenses, it is possible to suppress occurrence of a ghost between lenses of the first lens group RG1, and it is possible to reduce an effect of relative position error between lenses, such as eccentricity.

The second lens group RG2 substantially includes, in order from the object side, a second lens group first lens RL21 that is a negative lens concave toward the image side and a second lens group second lens RL22 that is a positive lens convex toward the object side. Hence, it is possible to suppress fluctuation in longitudinal chromatic aberration caused by mounting of the rear converter lens RCL.

In this case, the second lens group first lens RL21 and the second lens group second lens RL22 each may be formed as a single lens. In this case, it is possible to appropriately correct spherical aberration due to an effect of an air lens between an image side concave surface of the second lens group first lens RL21 as a negative lens and an object side convex surface of the second lens group second lens RL22. Further, it is preferable that the second lens group RG2 is formed of one set of cemented lenses in which the second lens group first lens RL21 and the second lens group second lens RL22 are cemented. In this case, even if an absolute value of a radius of curvature of a cemented surface is set to be small, it is possible to suppress occurrence of high-order aberrations. Thus, this configuration is advantageous in correcting the curvature of field, and it is possible to suppress fluctuation in longitudinal chromatic aberration caused by mounting of the rear converter lens RCL. Further, since the second lens group RG2 is formed of one set of cemented lenses, it is possible to suppress occurrence of a ghost between lenses of the second lens group RG2, and it is possible to further reduce an effect of relative position error between lenses, such as eccentricity.

The third lens group RG3 substantially includes, in order from the object side, a third lens group first lens RL31 that is a negative lens concave toward the object side, a third lens group second lens RL32 that is a positive lens convex toward the image side, and a third lens group third lens RL33 that is a negative lens concave toward the object side. By arranging three lenses constituting the third lens group RG3 such that the lenses have negative, positive, and negative powers in order from the object side, it is possible to suppress fluctuation in curvature of field caused by mounting of the rear converter lens RCL, and it is possible to suppress fluctuation in longitudinal chromatic aberration. In particular, by forming both an object side surface of the third lens group first lens RL31 and an object side surface of the third lens group third lens RL33 as concave surfaces, it is possible to suppress fluctuation in curvature of field with a higher accuracy.

It is preferable that the third lens group third lens RL33 has a meniscus shape which is concave toward the object side. In this case, it is possible to reduce an incident angle of off-axis principal rays incident onto each surface of the third lens group third lens RL33, and thus it is possible to reduce occurrence of astigmatism.

Further, it is preferable that, in the third lens group RG3, the third lens group first lens RL31 and the third lens group second lens RL32 are cemented. In this case, even if an absolute value of a radius of curvature of a cemented surface is set to be small, it is possible to suppress occurrence of high-order aberrations. Thus, this configuration is advantageous in correcting the curvature of field, and it is possible to suppress fluctuation in longitudinal chromatic aberration caused by mounting of the rear converter lens RCL. Further, by cementing the third lens group first lens RL31 and the third lens group second lens RL32, it is possible to suppress occurrence of a ghost between lenses of the third lens group RG3, and it is possible to further reduce an effect of relative position error between lenses, such as eccentricity. In order to further enhance such effects, as shown in FIGS. 3 and 4, the third lens group RG3 is formed of one set of cemented lenses in which the third lens group first lens RL31, the third lens group second lens RL32, and the third lens group third lens RL33 are cemented, in order from the object side.

In the third lens group RG3, as shown in FIGS. 1 and 2, the third lens group first lens RL31 and the third lens group second lens RL32 may be formed as one set of cemented lenses, and the third lens group third lens RL33 may be formed as a single lens.

The fourth lens group RG4 substantially includes, in order from the object side, a fourth lens group first lens RL41 that is a biconvex lens, and a fourth lens group second lens RL42 that is a negative lens concave toward the object side. By making a convex surface of the fourth lens group first lens RL41 toward the object side, it is possible to suppress fluctuation in spherical aberration caused by mounting of the rear converter lens RCL. Further, by making a concave surface of the fourth lens group second lens RL42 toward the object side, it is possible to reduce an incident angle of off-axis principal rays incident into the fourth lens group second lens RL42, and it is possible to reduce occurrence of astigmatism.

Further, it is preferable that the fourth lens group RG4 is formed of one set of cemented lenses in which the fourth lens group first lens RL41 and the fourth lens group second lens RL42 are cemented. In this case, it is possible to suppress occurrence of a ghost between lenses of the fourth lens group RG4, and it is possible to further reduce an effect of relative position error between lenses, such as eccentricity.

According to the rear converter lens RCL, the configuration using four groups is adopted. The four groups are, in order from the object side, the first lens group RG1 that has a positive refractive power, the second lens group RG2 that has a negative refractive power, the third lens group RG3 that has a negative refractive power, and the fourth lens group RG4 that has a positive refractive power. Thereby, the configuration of lens elements of the first lens group RG1 to the fourth lens group RG4 is optimized. Hence, it is possible to realize the rear converter lens RCL which has high optical performance and in which fluctuation in various aberrations including spherical aberration and chromatic aberration are satisfactorily suppressed.

In the example shown in FIG. 5, the master lens ML is a zoom lens that includes, in order from the object side, a first lens group G1, a second lens group G2, a third lens group G3, a diaphragm St, and a fourth lens group G4. In addition, the rear converter lens RCL shown in FIGS. 1 to 4 can be appropriately applied to the master lens ML shown in FIG. 5. Further, the diaphragm St (aperture diaphragm) in the master lens ML does not necessarily represent the size or shape, but represents a position thereof on the optical axis Z. In the master lens ML, the first lens group G1 and the fourth lens group G4 remain stationary during zooming from the wide-angle end to the telephoto end, the second lens group G2 and the third lens group G3 each move to the image side during zooming from the wide-angle end to the telephoto end.

Further, the first lens group G1 of the master lens ML is formed of four lenses including lenses L11 to L14. The second lens group G2 of the master lens ML is formed of five lenses including lenses L21 to L25. The third lens group G3 of the master lens ML is formed of three lenses including lenses L31 to L33. The fourth lens group G4 of the master lens ML is formed of eleven lenses including lenses L41 to L411.

Next, functions and effects of conditional expressions of the rear converter lens RCL configured as described above will be described in more detail. It should be noted that the rear converter lens RCL preferably satisfies any one of or any combination of the following conditional expressions. It is preferable that the satisfied conditional expressions are appropriately selected in accordance with the requirements of the rear converter lens RCL.

First, assuming that the focal length of the rear converter lens RCL is cf and the composite focal length of the first lens group RG1 and the second lens group RG2 is f12, it is preferable that the rear converter lens RCL satisfies the following conditional expression (1).

$$0.22 < cf/f12 < 1 \tag{1}$$

By suppressing the composite focal length f12 of the first lens group RG1 and the second lens group RG2 such that the result of the conditional expression (1) is greater than the lower limit, a front principal point position of the rear converter lens RCL is set to be close to the object side. Thus, it is possible to obtain a desired zoom ratio without excessively increasing the negative refractive power of the rear converter lens RCL. As a result, this configuration is advantageous in suppressing occurrence of the curvature of field. Further, since the rear principal point position can be set to be close to the object side, it is possible to reduce the back focal length to a desired length in a state where the rear converter lens RCL is mounted on the master lens ML while obtaining the desired zoom ratio, and it is possible to reduce a thickness of the rear converter lens RCL in the optical axis direction. Furthermore, by ensuring the composite focal length f12 of the first lens group RG1 and the second lens group RG2 such that the result of the conditional expression (1) is less than the upper limit, the back focal length is prevented from being elongated. As a result, this configuration is advantageous in correcting the curvature of field. In order to further enhance such effects, it is more preferable to satisfy the conditional expression (1-1), and it is further more preferable to satisfy the conditional expression (1-2).

$$0.24 < cf/f12 < 0.85 \tag{1-1}$$

$$0.25 < cf/f12 < 0.75 \tag{1-2}$$

Assuming that an average value of refractive indexes of all the negative lenses included in the rear converter lens at the d-line is Nnave and an average value of refractive indexes of all the positive lenses included in the rear converter lens at the d-line is Npave, it is preferable that the rear converter lens RCL satisfies the following conditional expression (2).

$$0.2 < Nnave - Npave < 0.5 \tag{2}$$

By setting a value of Nnave−Npave such that the result of the conditional expression (2) is greater than the lower limit, it is possible to prevent the curvature of field from being caused by the negative refractive power of the rear converter lens RCL. By setting the value of Nnave−Npave such that the result of the conditional expression (2) is less than the upper limit, it is possible to prevent the curvature of field and spherical aberration from being excessively corrected. Hence, by satisfying the conditional expression (2), it becomes easy to suppress the change of curvature of field caused by mounting of the rear converter lens RCL onto the master lens ML while satisfying the desired magnification and the desired back focal length range. In order to further enhance such effects, it is more preferable to satisfy the conditional expression (2-1), and it is further more preferable to satisfy the conditional expression (2-2).

$$0.22 < Nnave-Npave < 0.4 \quad (2\text{-}1)$$

$$0.24 < Nnave-Npave < 0.35 \quad (2\text{-}2)$$

Assuming that the sum of air distances among on-axis surface distances included in the rear converter lens RCL is $\Sigma$air, it is preferable that the rear converter lens RCL satisfies the following conditional expression (3). It should be noted that the sum of air distances among the on-axis surface distances included in the rear converter lens RCL is defined as a value that is obtained by integrating all the air distances included in the surface distances ranging from the first lens group first lens RL11, which is a most object side surface of the rear converter lens RCL, to the fourth lens group second lens RL42 which is a most image side surface.

$$0.08 < -\Sigma air/cf < 0.14 \quad (3)$$

By setting a value of $\Sigma$air such that the result of the conditional expression (3) is greater than the lower limit, it is possible to effectively use a function of the air lens, and it becomes easy to balance spherical aberration and curvature of field. By setting the value of $\Sigma$air such that the result of the conditional expression (3) is less than the upper limit, it is possible to reduce the thickness of the rear converter lens RCL in the optical axis direction. In order to further enhance such effects, it is more preferable to satisfy the conditional expression (3-1), and it is further more preferable to satisfy the conditional expression (3-2).

$$0.1 < -\Sigma air/cf < 0.135 \quad (3\text{-}1)$$

$$0.11 < -\Sigma air/cf < 0.13 \quad (3\text{-}2)$$

Assuming that a composite focal length of the third lens group first lens RL31 and the third lens group second lens RL32 is f3a and a focal length of the third lens group RG3 is f3, it is preferable that the rear converter lens RCL satisfies the following conditional expression (4).

$$-0.25 < f3/f3a < 1.0 \quad (4)$$

By suppressing the composite refractive power of the third lens group first lens RL31 and the third lens group second lens RL32 relative to the refractive power of the third lens group RG3 such that the result of the conditional expression (4) is greater than the lower limit, it is possible to appropriately ensure a negative refractive power of the entire third lens group RG3 without excessively increasing the negative refractive power of the third lens group third lens RL33. Thus, this configuration is advantageous in correcting the curvature of field. By suppressing the composite refractive power of the third lens group first lens RL31 and the third lens group second lens RL32 relative to the refractive power of the third lens group RG3 such that the result of the conditional expression (4) is less than the upper limit, a rear principal point of the rear converter lens RCL can be set to be close to the object side, and it is possible to reduce a back focal length thereof in a state where the rear converter lens RCL is mounted on the master lens ML. As a result, this configuration is advantageous in reduction in size. In order to further enhance such effects, it is more preferable to satisfy the conditional expression (4-1).

$$0 < f3/f3a < 0.5 \quad (4\text{-}1)$$

Assuming that a composite focal length of the first lens group RG1 and the second lens group RG2 is f12 and a composite focal length of the third lens group RG3 and the fourth lens group RG4 is f34, it is preferable that the rear converter lens RCL satisfies the following conditional expression (5).

$$-0.55 < (1/f12 - 1/f34) \times cf < 0.6 \quad (5)$$

By setting a difference between the composite focal length f12 of the first lens group RG1 and the second lens group RG2 and the composite focal length f34 of the third lens group RG3 and the fourth lens group RG4 such that the result of the conditional expression (5) is greater than the lower limit, the front principal point of the rear converter lens RCL can be set to be close to the object side. Thus, it is possible to obtain a desired zoom ratio without excessively increasing the negative refractive power of the rear converter lens RCL. As a result, this configuration is advantageous in suppressing occurrence of the curvature of field. Further, since the rear principal point position can be set to be close to the object side, it is possible to reduce the back focal length in a state where the rear converter lens RCL is mounted on the master lens ML while obtaining the desired zoom ratio, and it is possible to reduce the thickness of the rear converter lens RCL in the optical axis direction. By setting a difference between the composite focal length f12 of the first lens group RG1 and the second lens group RG2 and the composite focal length f34 of the third lens group RG3 and the fourth lens group RG4 such that the result of the conditional expression (5) is less than the upper limit, the back focal length is prevented from being excessively reduced. Further, this configuration is advantageous in correcting the curvature of field. In order to further enhance such effects, it is more preferable to satisfy the conditional expression (5-1), and it is further more preferable to satisfy the conditional expression (5-2).

$$-0.5 < (1/f12 - 1/f34) \times cf < 0.5 \quad (5\text{-}1)$$

$$-0.4 < (1/f12 - 1/f34) \times cf < 0.4 \quad (5\text{-}2)$$

In a case where any of the conditional expressions (5) to (5-2) is satisfied, assuming that the composite focal length of the first lens group RG1 and the second lens group RG2 is f12 and the composite focal length of the third lens group RG3 and the fourth lens group RG4 is f34, it is preferable that the rear converter lens RCL satisfies the following conditional expression (6).

$$0.98 < (1/f12 + 1/f34) \times cf < 1.2 \quad (6)$$

By satisfying the conditional expression (5) and by setting the composite focal length of the first lens group RG1 and the second lens group RG2 to f12 and setting the composite focal length of the third lens group RG3 and the fourth lens group RG4 to f34 such that the result of the conditional expression (6) is greater than the lower limit, it is possible to enhance the effect of making the front principal point of the rear converter lens RCL close to the object side, and it is possible to achieve a desired zoom ratio without excessively increasing the negative refractive power of the rear converter lens RCL. As a result, this configuration is advantageous in suppressing occurrence of the curvature of field. By satisfying the conditional expression (5) and by setting the composite focal length f12 of the first lens group RG1 and the second lens group RG2 and setting the composite focal length f34 of the third lens group RG3 and the fourth lens group RG4 such that the result of the conditional expression (6) is less than the upper limit, the sum of the refractive powers of the respective lens groups does not become excessively large relative to the refractive power of the entire rear converter lens RCL. Thus, this configuration is advantageous in suppressing occurrence of the curvature of field while ensuring the desired zoom ratio. In order to further enhance such effects, it is more preferable to satisfy the conditional expression (6-1).

$$1<(1/f12+1/f34) \times cf<1.15 \tag{6-1}$$

Assuming that a composite focal length of the first lens group RG1 and the second lens group RG2 is f12 and a composite focal length of the third lens group RG3 and the fourth lens group RG4 is f34, it is preferable that the rear converter lens RCL satisfies the following conditional expression (7).

$$0.3<f34/f12<4 \tag{7}$$

By setting the composite focal length f34 of the third lens group RG3 and the fourth lens group RG4 with respect to the composite focal length f12 of the first lens group RG1 and the second lens group RG2 such that the result of the conditional expression (7) is greater than the lower limit, the front principal point of the rear converter lens RCL can be set to be close to the object side. Thus, it is possible to obtain a desired zoom ratio without excessively increasing the negative refractive power of the rear converter lens RCL. As a result, this configuration is advantageous in suppressing occurrence of the curvature of field. If a sufficient magnification is intended to be obtained by increasing the negative refractive power of the rear converter lens RCL, the back focal length of the synthetic optical system in a state where the rear converter lens RCL is mounted on the master lens ML is elongated, and this is disadvantage in reduction in size. By setting the composite focal length f34 of the third lens group RG3 and the fourth lens group RG4 with respect to the composite focal length f12 of the first lens group RG1 and the second lens group RG2 such that the result of the conditional expression (7) is less than the upper limit, the back focal length is prevented from being excessively reduced. Further, this configuration is advantageous in correcting the curvature of field. In order to further enhance such effects, it is more preferable to satisfy the conditional expression (7-1), and it is further more preferable to satisfy the conditional expression (7-2).

$$0.32<f34/f12<3.5 \tag{7-1}$$

$$0.34<f34/f12<3 \tag{7-2}$$

Assuming that the paraxial radius of curvature of the most image side surface of the third lens group RG3 is G3r and the paraxial radius of curvature of the most object side surface of the third lens group RG3 is G3f, it is preferable that the rear converter lens RCL satisfies the following conditional expression (8).

$$0.7<(G3r+G3f)/(G3r-G3f)<3 \tag{8}$$

By forming the third lens group RG3 such that the result of the conditional expression (8) is greater than the lower limit, it is possible to reduce an incident angle of off-axis principal rays incident onto the most object side surface and the most image side surface of the third lens group RG3, and it is possible to achieve a desired negative refractive power while suppressing occurrence of astigmatism. By forming the third lens group RG3 such that the result of the conditional expression (8) is less than the upper limit, it is possible to prevent spherical aberration from occurring. In order to further enhance such effects, it is more preferable to satisfy the conditional expression (8-1), and it is further more preferable to satisfy the conditional expression (8-2).

$$0.9<(G3r+G3f)/(G3r-G3f)<2.5 \tag{8-1}$$

$$1<(G3r+G3f)/(G3r-G3f)<2.3 \tag{8-2}$$

Assuming that a paraxial radius of curvature of an image side surface of the third lens group third lens RL33 is R33r and a paraxial radius of curvature of an object side surface of the third lens group third lens RL33 is R33f, the rear converter lens RCL satisfies the following conditional expression (9).

$$0.7<(R33r+R33f)/(R33r-R33f)<2 \tag{9}$$

By forming the third lens group third lens RL33 such that the result of the conditional expression (9) is greater than the lower limit, it is possible to reduce an incident angle of off-axis principal rays incident onto each surface of the third lens group third lens RL33, and it is possible to suppress occurrence of astigmatism. By forming the third lens group third lens RL33 such that the result of the conditional expression (9) is less than the upper limit, it is possible to reduce an incident angle of on-axis marginal rays onto the object side surface of the third lens group third lens RL33, and it is possible to suppress occurrence of spherical aberration. In order to further enhance such effects, it is more preferable to satisfy the conditional expression (9-1), and it is further more preferable to satisfy the conditional expression (9-2).

$$0.9<(R33r+R33f)/(R33r-R33f)<1.8 \tag{9-1}$$

$$1<(R33r+R33f)/(R33r-R33f)<1.6 \tag{9-2}$$

Assuming that a focal length of the entire rear converter lens RCL is cf and a maximum image height is IH, it is preferable that, in a state where the rear converter lens RCL is mounted on the image side of the master lens ML, the rear converter lens RCL satisfies the following conditional expression (10). The maximum image height means a maximum image height in a state where a synthetic optical system having the rear converter lens RCL mounted on the master lens ML is in focus on an infinite object. Further, in a state where an imaging surface of a solid-state imaging element is positioned on the imaging plane of the synthetic optical system, the maximum image height corresponds to a half of a value of a diagonal length of an effective pixel region in a case where the imaging surface of the solid-state imaging element has a rectangular effective pixel region.

$$-0.46<IH/cf<-0.3 \tag{10}$$

By forming the rear converter lens RCL such that the result of the conditional expression (10) is greater than the lower limit, it is possible to prevent the negative refractive power of the rear converter lens RCL from increasing, and it is possible to prevent curvature of field from occurring. By forming the rear converter lens RCL such that the result of the conditional expression (10) is less than the upper limit configuration, this configuration is advantageous in ensuring the zoom ratio. In order to further enhance such effects, it is more preferable to satisfy the conditional expression (10-1), and it is further more preferable to satisfy the conditional expression (10-2).

$$-0.44<IH/cf<-0.32 \tag{10-1}$$

$$-0.4<IH/cf<-0.34 \tag{10-2}$$

By satisfying the appropriate preferred conditions, the rear converter lens RCL is able to achieve further high imaging performance.

In the above-mentioned embodiment, the configurations of lens elements of the first lens group RG1 to the fourth lens group RG4 are optimized, and the rear converter lens RCL satisfies the conditional expression (1). Thereby, the related rear converter lens RCL has favorable optical performance with a high magnification, and is able to achieve an appropriate back focal length. As a result, the rear converter lens RCL can be appropriately applied to a non-reflex digital camera such as a so-called mirrorless camera.

For example, for a rear converter lens for a non-reflex digital camera, it is preferable to achieve a high magnification of 1.8 times or more. In a state where the rear converter lens is mounted on the master lens, it is preferable that a ratio of the back focal length to the maximum image height is about 1 to 2.5 times as an appropriate range in which the rear converter lens RCL can be mounted between the camera main body and the master lens ML while an increase in lens total length is suppressed. In the examples shown in FIGS. 1 to 4, in the state where the rear converter lens is mounted on the master lens, a zoom ratio of 2.0 times is achieved. Thus, the ratio of the back focal length to the maximum image height satisfies a range of 1 to 2.5 times.

In contrast, for example, if the lenses of the examples of JP2012-47869A are standardized for a non-reflex camera, in Examples 1 and 2, the zoom ratio of the synthetic optical system is smaller than 1.8 times, and in Example 1, the ratio of the back focal length to the maximum image height is insufficient. Further, in Example 3, the ratio of the back focal length to the maximum image height of the synthetic optical system becomes excessively large, the size thereof cannot be reduced, the negative refractive power of the rear converter lens becomes excessively large, and this causes an increase in curvature of field.

In a case where the rear converter lens RCL is used in a severe environment, it is preferable to apply protective multilayer film coating. Not only the protective coating but also antireflective coating for reducing ghost light in use may be performed.

In the examples shown in FIGS. 5 and 6, there is shown an example in which an optical member PP assumed as various filters each having a plane parallel plate shape is disposed between the lens system and the image plane Sim. The present invention is not limited to this, and a low-pass filter and/or various filters for cutting a specific wavelength region does not have to be disposed between the lens system and the image plane Sim. Instead, these various filters may be disposed between the respective lenses. Further, for example, coating having the same function as the various filters may be applied to a lens surface of any one of the lenses.

Next, a configuration example of the master lens ML and numerical examples of the rear converter lens RCL of the present invention will be described.

First, the master lens ML will be described. FIG. 5 shows a cross-sectional view of the rear converter lens RCL of Example 1 mounted on the master lens ML. Further, Table 1 shows specific lens data corresponding to a configuration using the master lens ML alone, and Table 2 shows data about specification and variable surface distances.

The column of Si in the lens data shown in Table 1 shows i-th surface number. The i-th surface number is referred to each of surfaces of optical elements in an optical system, where i sequentially increases toward the image side when an object side surface of an optical element closest to the object side is regarded as a first surface. The column of the paraxial radius of curvature Ri shows a value (mm) of a radius of curvature of the i-th surface from the object side. Likewise, the column of the surface distance Di shows a distance (mm) on the optical axis Z between the i-th surface Si and an (i+1)-th surface Si+1 from the object side. The column of Ndj shows a value of a refractive index of a j-th optical element from the object side at the d-line (a wavelength of 587.6 nm). The column of vdj shows a value of an Abbe number of the j-th optical element from the object side at the d-line. It should be noted that the sign of the radius of curvature is positive in a case where a surface has a shape convex toward the object side, and is negative in a case where a surface has a shape convex toward the image side. Table 1 additionally shows the aperture diaphragm St and the optical member PP, and in a place of a surface number of a surface corresponding to the aperture diaphragm St, the surface number and a term of (St) are noted.

In Table 1, the surface distances, which are variable during zooming, are referenced by the reference signs DD[ ], where object side surface numbers of distances are noted in [ ]. Specifically, DD[7], DD[15], and DD[20] of Table 1 are variable surface distances which are variable during zooming, and respectively correspond to a distance between the first lens group G1 and the second lens group G2, a distance between the second lens group G2 and the third lens group G3, and a distance between the third lens group G3 and the diaphragm St.

Table 2 shows values of the zoom ratio, the focal length f of the whole system, the back focal length Bf of the whole system, the F number FNo., and the maximum angle of view 2ω in a state where an infinite object is in focus. It should be noted that the back focal length Bf is an air-converted value. Table 2 shows, as the variable surface distances, values of variable surface distances at the wide-angle end, the middle focal length state (abbreviated as "middle" in Table 2), the telephoto end, respectively. In the lens data and the expression data, a degree (°) is used as a unit of an angle, and millimeter (mm) is used as a unit of a length, but appropriate different units may be used since the optical system can be used even in a case where the system is enlarged or reduced in proportion. And nanometer (nm) is used as a unit of a wavelength.

TABLE 1

| Master Lens | | | | |
|---|---|---|---|---|
| Si | Ri | Di | Ndj | vdj |
| 1 | 314.4308 | 2.290 | 1.80100 | 34.97 |
| 2 | 80.8630 | 7.400 | 1.49700 | 81.54 |
| 3 | −411.6253 | 0.200 | | |
| 4 | 70.8095 | 7.100 | 1.43875 | 94.94 |
| 5 | ∞ | 0.200 | | |
| 6 | 69.9388 | 5.240 | 1.49700 | 81.54 |
| 7 | 243.2625 | DD[7] | | |
| 8 | 97.3350 | 6.280 | 1.72047 | 34.71 |
| 9 | −44.4430 | 1.540 | 1.62230 | 53.17 |
| 10 | 24.5106 | 5.600 | | |
| 11 | −67.3261 | 1.410 | 1.49700 | 81.54 |
| 12 | 26.8210 | 4.000 | 1.84661 | 23.88 |
| 13 | 128.9145 | 3.130 | | |
| 14 | −31.5622 | 1.200 | 1.91082 | 35.25 |
| 15 | 268.8915 | DD[15] | | |
| 16 | −454.7411 | 2.650 | 1.80100 | 34.97 |
| 17 | −44.3534 | 0.100 | | |
| 18 | 73.4584 | 4.260 | 1.61800 | 63.33 |
| 19 | −43.2070 | 1.170 | 1.80518 | 25.42 |
| 20 | ∞ | DD[20] | | |
| 21(St) | ∞ | 1.300 | | |

TABLE 1-continued

Master Lens

| Si | Ri | Di | Ndj | vdj |
|----|------|------|------|------|
| 22 | 27.8674 | 7.050 | 1.49700 | 81.54 |
| 23 | −58.7589 | 0.150 | | |
| 24 | 34.5685 | 2.570 | 1.65412 | 39.68 |
| 25 | 84.5573 | 1.600 | | |
| 26 | −50.7158 | 1.100 | 1.90366 | 31.31 |
| 27 | 23.9830 | 5.210 | 1.49700 | 81.54 |
| 28 | −62.4364 | 2.800 | | |
| 29 | 452.2104 | 3.760 | 1.80518 | 25.42 |
| 30 | −23.3710 | 0.960 | 1.58913 | 61.13 |
| 31 | 39.4316 | 2.480 | | |
| 32 | −40.8960 | 1.000 | 1.80100 | 34.97 |
| 33 | 60.1440 | 3.970 | | |
| 34 | 53.0700 | 5.360 | 1.80000 | 29.84 |
| 35 | −37.6531 | 4.950 | | |
| 36 | 49.5305 | 6.460 | 1.48749 | 70.24 |
| 37 | −26.0930 | 1.310 | 1.80518 | 25.42 |
| 38 | −92.8937 | 4.400 | | |
| 38 | −27.4751 | 1.260 | 1.91082 | 35.25 |
| 40 | −40.9228 | 26.389 | | |
| 41 | ∞ | 2.850 | 1.51633 | 64.14 |
| 42 | ∞ | 3.617 | | |

TABLE 2

Master Lens

| | WIDE-ANGLE END | MIDDLE | TELEPHOTO END |
|---|---|---|---|
| ZOOM RATIO | 1.0 | 1.6 | 2.6 |
| f | 51.516 | 83.692 | 135.965 |
| Bf | 29.41 | 29.41 | 29.41 |
| FNo. | 2.88 | 2.89 | 2.88 |
| 2ω | 30.6 | 18.8 | 11.6 |
| DD[7] | 1.39 | 19.54 | 31.16 |
| DD[15] | 14.30 | 9.95 | 2.69 |
| DD[20] | 27.99 | 14.19 | 9.82 |

Regarding meanings of signs in the above Tables, Tables 1 and 2 are used as examples. However, Tables 3 to 10 are basically the same except that the focal length cf of the rear converter lens alone is additionally noted in tables showing data about specification and variable surface distances. Tables 3 to 10 show respective data pieces of all configurations in which the master lenses ML shown in Tables 1 and 2 and the rear converter lenses RCL corresponding to Examples 1 to 4 each are combined. The master lens ML is the same in Examples 1 to 4, and the lens data pieces about the rear converter lenses RCL of Examples 1 to 4 are set forth in Si numbers 41-54 in Tables 3 and 5, and Si numbers 41-53 in Tables 7 and 9. In Table 2, the focal length f of the whole system indicates a focal length of the master lens ML alone, the back focal length Bf of the whole system indicates a back focal length of the master lens ML alone, the F number FNo. indicates an F number of the master lens ML alone, and the maximum angle of view 2ω indicates a maximum angle of view of the master lens ML alone. Further, in Tables 4, 6, 8 and 10, the focal length f of the whole system indicates a composite focal length of the synthetic optical system in which the rear converter lens RCL and the master lens ML are combined, the back focal length Bf of the whole system indicates a back focal length of the same synthetic optical system, F number FNo. indicates an F number of the same synthetic optical system, and the maximum angle of view 2ω indicates a maximum angle of view of the same synthetic optical system.

Figure 7:
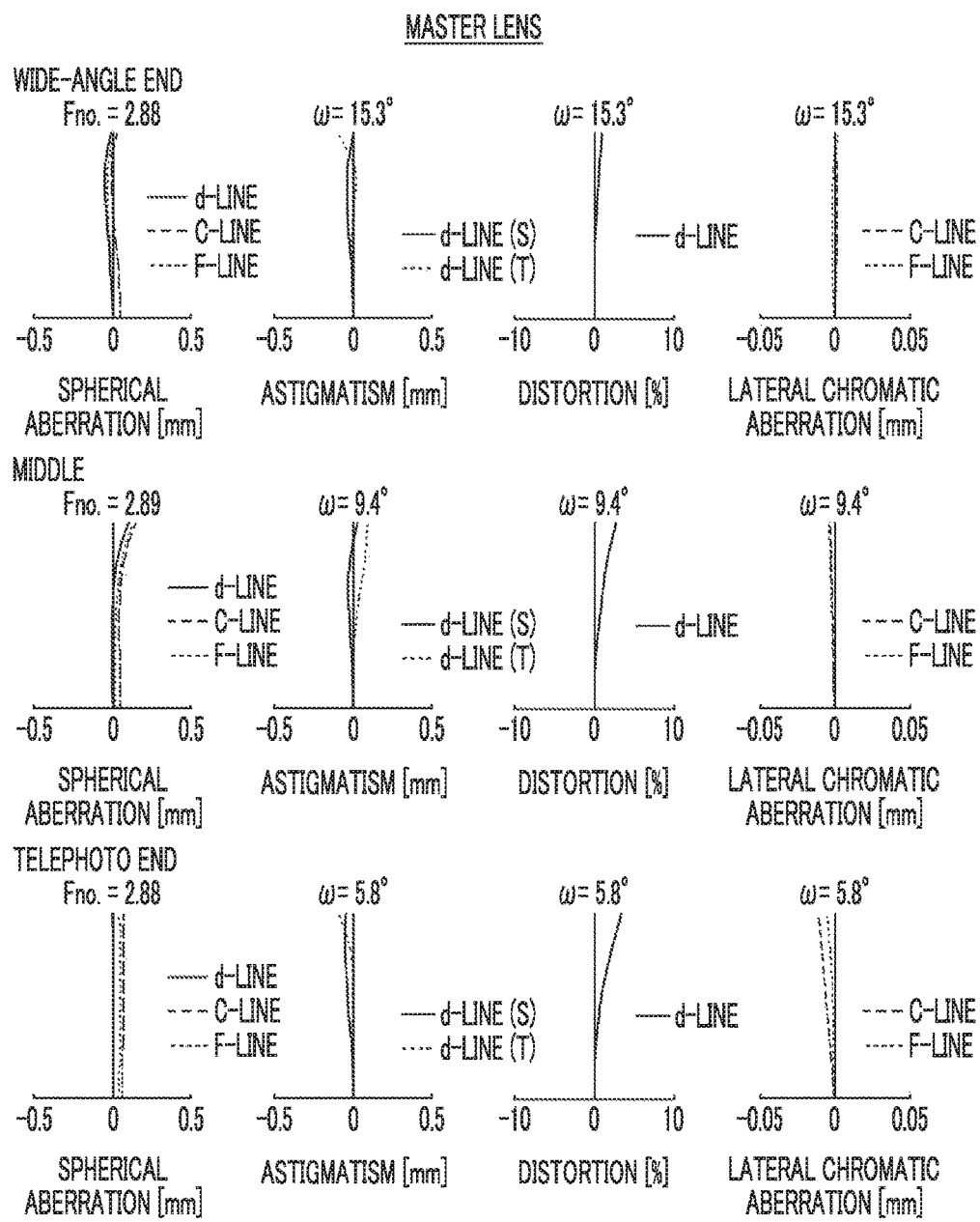
FIG. 7 is an aberration diagram illustrating various aberrations of a master lens alone, and shows spherical aberration, astigmatism, distortion, and lateral chromatic aberration, in order from the left side.

FIG. 7 shows diagrams of aberrations of the master lens ML alone. In FIG. 7, aberrations at wide-angle end include, in order from the top left side, spherical aberration, astigmatism, distortion (distortion aberration), lateral chromatic aberration (chromatic aberration of magnification). In addition, aberrations at the middle focal length include, in order from the middle left side, spherical aberration, astigmatism, distortion (distortion aberration), and lateral chromatic aberration (chromatic aberration of magnification). In addition, aberrations at the telephoto end include, in order from the bottom left side, spherical aberration, astigmatism, distortion (distortion aberration), and lateral chromatic aberration (chromatic aberration of magnification). In FIG. 7, aberration diagrams illustrating spherical aberration, astigmatism, and distortion indicate aberrations that occur when the d-line (a wavelength of 587.6 nm) is set as a reference wavelength. In the spherical aberration diagram, aberrations at the d-line, the C-line (a wavelength of 656.3 nm), and the F-line (a wavelength of 486.1 nm) are respectively indicated by the solid line, the dashed line, and the dotted line. In the astigmatism diagram, aberrations in sagittal and tangential directions are respectively indicated by the solid line and the dotted line. In the lateral chromatic aberration diagram, aberrations at the C-line and the F-line are respectively indicated by the dashed line and the dotted line. In the spherical aberration diagram, FNo. indicates an F number. In the other aberration diagrams, ω indicates a half angle of view. The meanings of the reference signs are, for example, as described in FIG. 7, and are basically the same as those in FIGS. 8 to 11. Further, all the aberration diagrams shown in FIGS. 7 to 11 are based on a case where the object distance is at the infinity.

Figure 8:
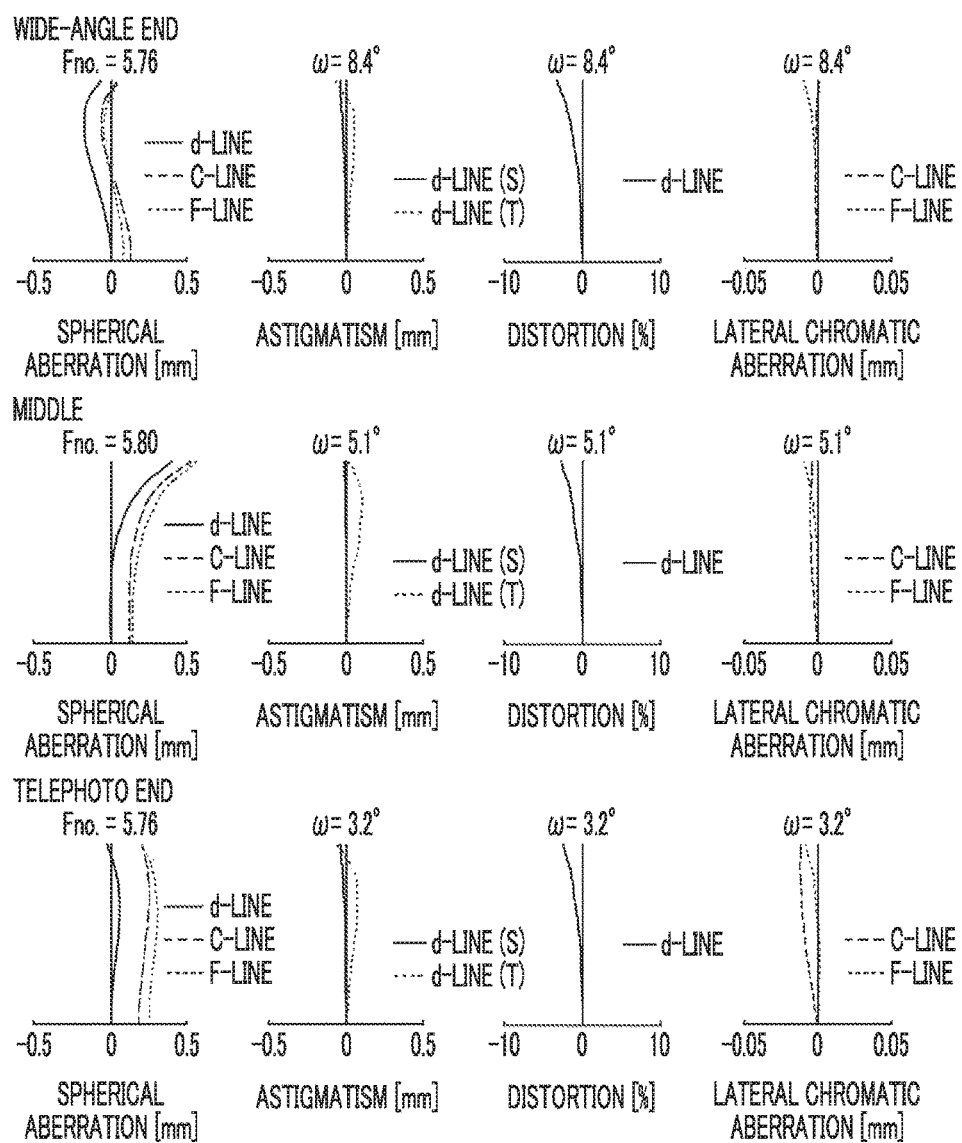
FIG. 8 is an aberration diagram illustrating various aberrations of the rear converter lens (when mounted on the master lens) of Example 1 of the present invention, and shows spherical aberration, astigmatism, distortion, and lateral chromatic aberration, in order from the left side.

Next, the rear converter lens RCL of Example 1 will be described. FIG. 1 shows a cross-sectional view illustrating a lens configuration of the rear converter lens RCL of Example 1. FIG. 5 shows a cross-sectional view illustrating an overall configuration in a state where the rear converter lens RCL of Example 1 is mounted on the master lens ML. FIG. 6 shows a ray diagram in which rays are added to FIG. 5. Table 3 shows lens data of the synthetic optical system in which the rear converter lens RCL of Example 1 is mounted on the master lens ML. Table 4 shows data about specification and variable surface distances. Further, FIG. 8 shows aberration diagrams in a state where the rear converter lens RCL of Example 1 is mounted on the master lens ML.

TABLE 3

Example 1

| Si | Ri | Di | Ndj | vdj |
|----|------|------|------|------|
| 1 | 314.4308 | 2.290 | 1.80100 | 34.97 |
| 2 | 80.8630 | 7.400 | 1.49700 | 81.54 |
| 3 | −411.6253 | 0.200 | | |
| 4 | 70.8095 | 7.100 | 1.43875 | 94.94 |
| 5 | ∞ | 0.200 | | |
| 6 | 69.9388 | 5.240 | 1.49700 | 81.54 |
| 7 | 243.2625 | DD[7] | | |
| 8 | 97.3350 | 6.280 | 1.72047 | 34.71 |
| 9 | −44.4430 | 1.540 | 1.62230 | 53.17 |
| 10 | 24.5106 | 5.600 | | |
| 11 | −67.3261 | 1.410 | 1.49700 | 81.54 |
| 12 | 26.8210 | 4.000 | 1.84661 | 23.88 |
| 13 | 128.9145 | 3.130 | | |
| 14 | −31.5622 | 1.200 | 1.91082 | 35.25 |
| 15 | 268.8915 | DD[15] | | |
| 16 | −454.7411 | 2.650 | 1.80100 | 34.97 |
| 17 | −44.3534 | 0.100 | | |
| 18 | 73.4584 | 4.260 | 1.61800 | 63.33 |
| 19 | −43.2070 | 1.170 | 1.80518 | 25.42 |
| 20 | ∞ | DD[20] | | |
| 21(St) | ∞ | 1.300 | | |

TABLE 3-continued

Example 1

| Si | Ri | Di | Ndj | vdj |
|---|---|---|---|---|
| 22 | 27.8674 | 7.050 | 1.49700 | 81.54 |
| 23 | −58.7589 | 0.150 | | |
| 24 | 34.5685 | 2.570 | 1.65412 | 39.68 |
| 25 | 84.5573 | 1.600 | | |
| 26 | −50.7158 | 1.100 | 1.90366 | 31.31 |
| 27 | 23.9830 | 5.210 | 1.49700 | 81.54 |
| 28 | −62.4364 | 2.800 | | |
| 29 | 452.2104 | 3.760 | 1.80518 | 25.42 |
| 30 | −23.3710 | 0.960 | 1.58913 | 61.13 |
| 31 | 39.4316 | 2.480 | | |
| 32 | −40.8960 | 1.000 | 1.80100 | 34.97 |
| 33 | 60.1440 | 3.970 | | |
| 34 | 53.0700 | 5.360 | 1.80000 | 29.84 |
| 35 | −37.6531 | 4.950 | | |
| 36 | 49.5305 | 6.460 | 1.48749 | 70.24 |
| 37 | −26.0930 | 1.310 | 1.80518 | 25.42 |
| 38 | −92.8937 | 4.400 | | |
| 38 | −27.4751 | 1.260 | 1.91082 | 35.25 |
| 40 | −40.9228 | 26.389 | | |
| 41 | 82.3854 | 0.900 | 1.68300 | 40.76 |
| 42 | 19.0130 | 5.160 | 1.62004 | 36.28 |
| 43 | −33.9161 | 2.500 | | |
| 44 | −34.6013 | 0.910 | 1.88300 | 40.78 |
| 45 | 17.9890 | 4.150 | 1.74077 | 27.79 |
| 46 | −132.7745 | 2.200 | | |
| 47 | −31.1833 | 0.930 | 1.88300 | 40.76 |
| 48 | 53.4860 | 5.290 | 1.57501 | 41.50 |
| 49 | −20.9775 | 0.100 | | |
| 50 | −24.9990 | 0.910 | 1.90043 | 37.37 |
| 51 | −264.6340 | 0.200 | | |
| 52 | 31.0672 | 7.340 | 1.67300 | 38.15 |
| 53 | −24.6320 | 1.000 | 2.00069 | 25.46 |
| 54 | −69.0128 | 23.596 | | |
| 55 | ∞ | 2.850 | 1.51880 | 64.20 |
| 56 | ∞ | 0.001 | | |

TABLE 4

Example 1

| | WIDE-ANGLE END | MIDDLE | TELEPHOTO END |
|---|---|---|---|
| ZOOM RATIO | 1.0 | 1.6 | 2.6 |
| cf | −41.726 | −41.726 | −41.726 |
| f | 102.997 | 167.327 | 271.837 |
| Bf | 25.47 | 25.47 | 25.47 |
| FNo. | 5.76 | 5.80 | 5.76 |
| 2ω | 16.8 | 10.2 | 6.4 |
| DD[7] | 1.39 | 19.54 | 31.16 |
| DD[15] | 14.30 | 9.95 | 2.69 |
| DD[20] | 27.99 | 14.19 | 9.82 |

Figure 9:
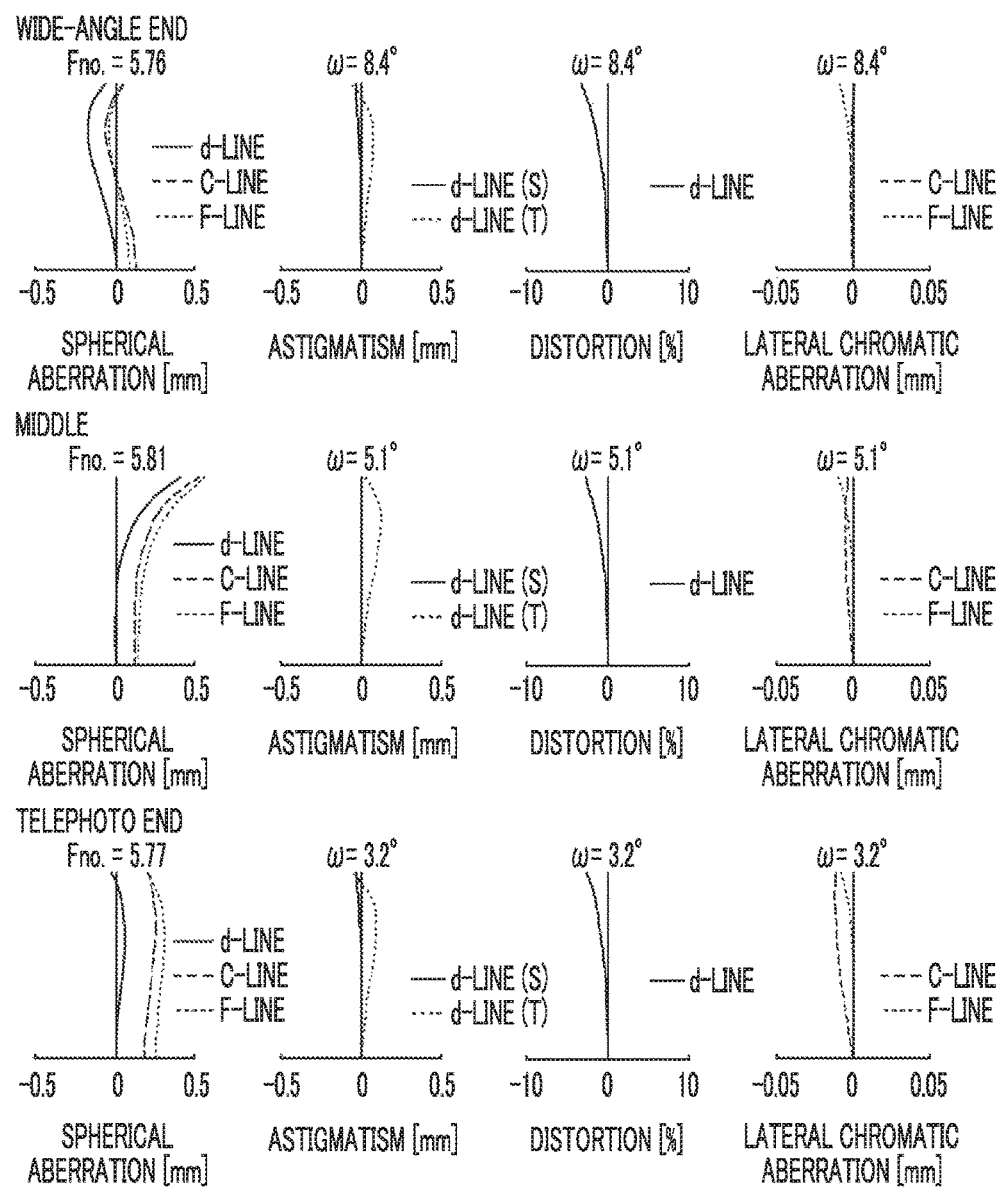
FIG. 9 is an aberration diagram illustrating various aberrations of the rear converter lens (when mounted on the master lens) of Example 2 of the present invention, and shows spherical aberration, astigmatism, distortion, and lateral chromatic aberration, in order from the left side.

Next, the rear converter lens RCL of Example 2 will be described. FIG. 2 shows a cross-sectional view illustrating a lens configuration of the rear converter lens RCL of Example 2. Table 5 shows lens data of the synthetic optical system in which the rear converter lens RCL of Example 2 is mounted on the master lens ML. Table 6 shows data about specification and variable surface distances. Further, FIG. 9 shows aberration diagrams in a state where the rear converter lens RCL of Example 2 is mounted on the master lens ML.

TABLE 5

Example 2

| Si | Ri | Di | Ndj | vdj |
|---|---|---|---|---|
| 1 | 314.4308 | 2.290 | 1.80100 | 34.97 |
| 2 | 80.8630 | 7.400 | 1.49700 | 81.54 |
| 3 | −411.6253 | 0.200 | | |
| 4 | 70.8095 | 7.100 | 1.43875 | 94.94 |
| 5 | ∞ | 0.200 | | |
| 6 | 69.9388 | 5.240 | 1.49700 | 81.54 |
| 7 | 243.2625 | DD[7] | | |
| 8 | 97.3350 | 6.280 | 1.72047 | 34.71 |
| 9 | −44.4430 | 1.540 | 1.62230 | 53.17 |
| 10 | 24.5106 | 5.600 | | |
| 11 | −67.3261 | 1.410 | 1.49700 | 81.54 |
| 12 | 26.8210 | 4.000 | 1.84661 | 23.88 |
| 13 | 128.9145 | 3.130 | | |
| 14 | −31.5622 | 1.200 | 1.91082 | 35.25 |
| 15 | 268.8915 | DD[15] | | |
| 16 | −454.7411 | 2.650 | 1.80100 | 34.97 |
| 17 | −44.3534 | 0.100 | | |
| 18 | 73.4584 | 4.260 | 1.61800 | 63.33 |
| 19 | −43.2070 | 1.170 | 1.80518 | 25.42 |
| 20 | ∞ | DD[20] | | |
| 21(St) | ∞ | 1.300 | | |
| 22 | 27.8674 | 7.050 | 1.49700 | 81.54 |
| 23 | −58.7589 | 0.150 | | |
| 24 | 34.5685 | 2.570 | 1.65412 | 39.68 |
| 25 | 84.5573 | 1.800 | | |
| 26 | −50.7158 | 1.100 | 1.90366 | 31.31 |
| 27 | 23.9830 | 5.210 | 1.49700 | 81.54 |
| 28 | −62.4364 | 2.800 | | |
| 29 | 452.2104 | 3.760 | 1.80518 | 25.42 |
| 30 | −23.3710 | 0.960 | 1.58913 | 61.13 |
| 31 | 39.4316 | 2.480 | | |
| 32 | −40.8960 | 1.000 | 1.80100 | 34.97 |
| 33 | 60.1440 | 3.970 | | |
| 34 | 53.0700 | 5.360 | 1.80000 | 29.84 |
| 35 | −37.6531 | 4.950 | | |
| 36 | 49.5305 | 6.460 | 1.48749 | 70.24 |
| 37 | −26.0930 | 1.310 | 1.80518 | 25.42 |
| 38 | −92.8937 | 4.400 | | |
| 38 | −27.4751 | 1.260 | 1.91082 | 35.25 |
| 40 | −40.9228 | 2.500 | | |
| 41 | 82.1367 | 0.900 | 1.88300 | 40.76 |
| 42 | 19.0000 | 5.130 | 1.62004 | 36.28 |
| 43 | −33.9400 | 2.500 | | |
| 44 | −35.1306 | 0.910 | 1.98300 | 40.78 |
| 45 | 17.9999 | 4.268 | 1.72825 | 28.46 |
| 46 | −91.6963 | 2.200 | | |
| 47 | −25.8564 | 0.930 | 1.88300 | 40.76 |
| 48 | 71.8118 | 5.510 | 1.57501 | 41.50 |
| 49 | −19.4999 | 0.100 | | |
| 50 | −25.8564 | 0.910 | 1.90043 | 37.37 |
| 51 | −611.5884 | 0.200 | | |
| 52 | 31.4174 | 7.140 | 1.67300 | 38.15 |
| 53 | −24.8579 | 1.000 | 2.00069 | 25.48 |
| 54 | −67.3882 | 23.473 | | |
| 55 | ∞ | 2.850 | 1.51680 | 64.20 |
| 56 | ∞ | 0.002 | | |

TABLE 6

Example 2

| | WIDE-ANGLE END | MIDDLE | TELEPHOTO END |
|---|---|---|---|
| ZOOM RATIO | 1.0 | 1.6 | 2.6 |
| cf | −41.910 | −41.910 | −41.910 |
| f | 102.997 | 167.327 | 271.837 |
| Bf | 25.35 | 25.35 | 25.35 |
| FNo. | 5.76 | 5.80 | 5.76 |
| 2ω | 16.8 | 10.2 | 6.4 |
| DD[7] | 1.39 | 19.54 | 31.16 |
| DD[15] | 14.30 | 9.95 | 2.69 |
| DD[20] | 27.99 | 14.19 | 9.82 |

Figure 10:
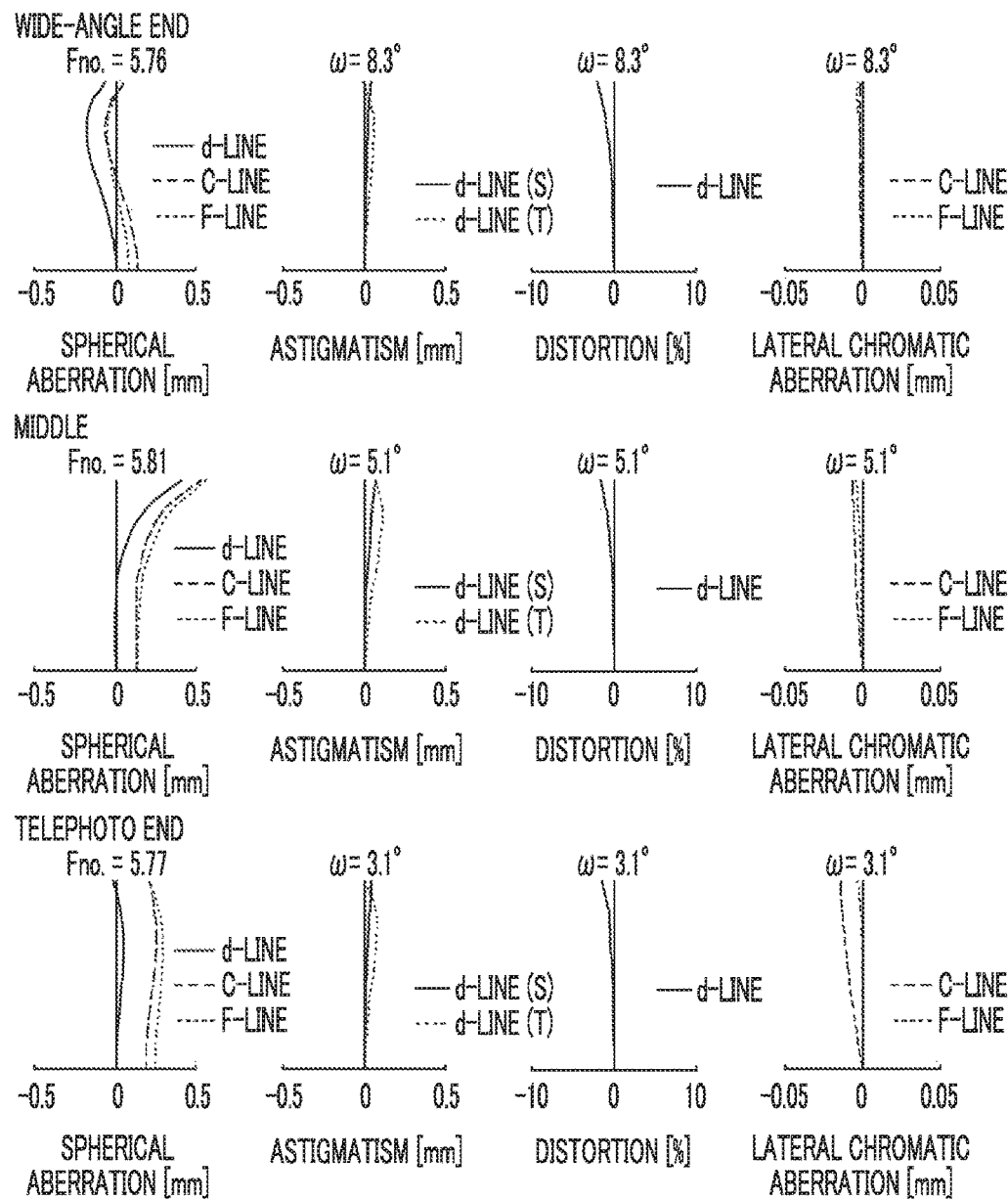
FIG. 10 is an aberration diagram illustrating various aberrations of the rear converter lens (when mounted on the master lens) of Example 3 of the present invention, and shows spherical aberration, astigmatism, distortion, and lateral chromatic aberration, in order from the left side.

Next, the rear converter lens RCL of Example 3 will be described. FIG. 3 shows a cross-sectional view illustrating a lens configuration of the rear converter lens RCL of Example 3. Table 7 shows lens data of the synthetic optical system in which the rear converter lens RCL of Example 3 is mounted on the master lens ML. Table 8 shows data about specification and variable surface distances. Further, FIG. 10 shows aberration diagrams in a state where the rear converter lens RCL of Example 3 is mounted on the master lens ML.

TABLE 7

Example 3

| Si | Ri | Di | Ndj | vdj |
|---|---|---|---|---|
| 1 | 314.4308 | 2.290 | 1.80100 | 34.97 |
| 2 | 80.8630 | 7.400 | 1.49700 | 81.54 |
| 3 | −411.6253 | 0.200 | | |
| 4 | 70.8095 | 7.100 | 1.43875 | 94.94 |
| 5 | ∞ | 0.200 | | |
| 6 | 69.9388 | 5.240 | 1.49700 | 81.54 |
| 7 | 243.2625 | DD[7] | | |
| 8 | 97.3350 | 6.280 | 1.72047 | 34.71 |
| 9 | −44.4430 | 1.540 | 1.62230 | 53.17 |
| 10 | 24.5106 | 5.600 | | |
| 11 | −67.3261 | 1.410 | 1.49700 | 81.54 |
| 12 | 26.8210 | 4.000 | 1.84661 | 23.88 |
| 13 | 128.9145 | 3.130 | | |
| 14 | −31.5622 | 1.200 | 1.91082 | 35.25 |
| 15 | 268.8915 | DD[15] | | |
| 16 | −454.7411 | 2.650 | 1.80100 | 34.97 |
| 17 | −44.3534 | 0.100 | | |
| 18 | 73.4584 | 4.260 | 1.61800 | 63.33 |
| 19 | −43.2070 | 1.170 | 1.80518 | 25.42 |
| 20 | ∞ | DD[20] | | |
| 21(St) | ∞ | 1.300 | | |
| 22 | 27.8674 | 7.050 | 1.49700 | 81.54 |
| 23 | −58.7589 | 0.150 | | |
| 24 | 34.5685 | 2.570 | 1.65412 | 39.68 |
| 25 | 84.5573 | 1.800 | | |
| 26 | −50.7158 | 1.100 | 1.90366 | 31.31 |
| 27 | 23.9830 | 5.210 | 1.49700 | 81.54 |
| 28 | −62.4364 | 2.800 | | |
| 29 | 452.2104 | 3.760 | 1.80518 | 25.42 |
| 30 | −23.3710 | 0.960 | 1.58913 | 61.13 |
| 31 | 39.4316 | 2.480 | | |
| 32 | −40.8960 | 1.000 | 1.80100 | 34.97 |
| 33 | 60.1440 | 3.970 | | |
| 34 | 53.0700 | 5.360 | 1.80000 | 29.84 |
| 35 | −37.6531 | 4.950 | | |
| 36 | 49.5305 | 6.460 | 1.48749 | 70.24 |
| 37 | −26.0930 | 1.310 | 1.80518 | 25.42 |
| 38 | −92.8937 | 4.400 | | |
| 38 | −27.4751 | 1.260 | 1.91082 | 35.25 |
| 40 | −40.9228 | 2.500 | | |
| 41 | 63.2329 | 0.930 | 1.88300 | 40.75 |
| 42 | 21.0000 | 4.710 | 1.62004 | 36.26 |
| 43 | −40.9802 | 1.935 | | |
| 44 | −55.7511 | 0.930 | 1.88300 | 40.76 |
| 45 | 19.0000 | 3.500 | 1.68893 | 31.07 |
| 46 | −909.4002 | 2.080 | | |
| 47 | −33.2661 | 0.930 | 1.80400 | 46.57 |
| 48 | 26.6110 | 6.020 | 1.62588 | 35.70 |
| 49 | −21.5000 | 0.930 | 1.88300 | 40.76 |
| 50 | −285.1195 | 0.200 | | |
| 51 | 28.7157 | 6.278 | 1.54072 | 47.23 |
| 52 | −26.0000 | 1.000 | 2.00100 | 29.13 |
| 53 | −72.4568 | 22.178 | | |
| 54 | ∞ | 2.850 | 1.51880 | 64.20 |
| 55 | ∞ | 0.001 | | |

TABLE 8

Example 3

| | WIDE-ANGLE END | MIDDLE | TELEPHOTO END |
|---|---|---|---|
| ZOOM RATIO | 1.0 | 1.6 | 2.6 |
| cf | −34.650 | −34.650 | −34.650 |
| f | 103.006 | 167.342 | 271.860 |
| Bf | 24.06 | 24.06 | 24.06 |
| FNo. | 5.76 | 5.81 | 5.77 |
| 2ω | 16.6 | 10.2 | 6.2 |
| DD[7] | 1.39 | 19.54 | 31.16 |
| DD[15] | 14.30 | 9.95 | 2.69 |
| DD[20] | 27.99 | 14.19 | 9.82 |

Figure 11:
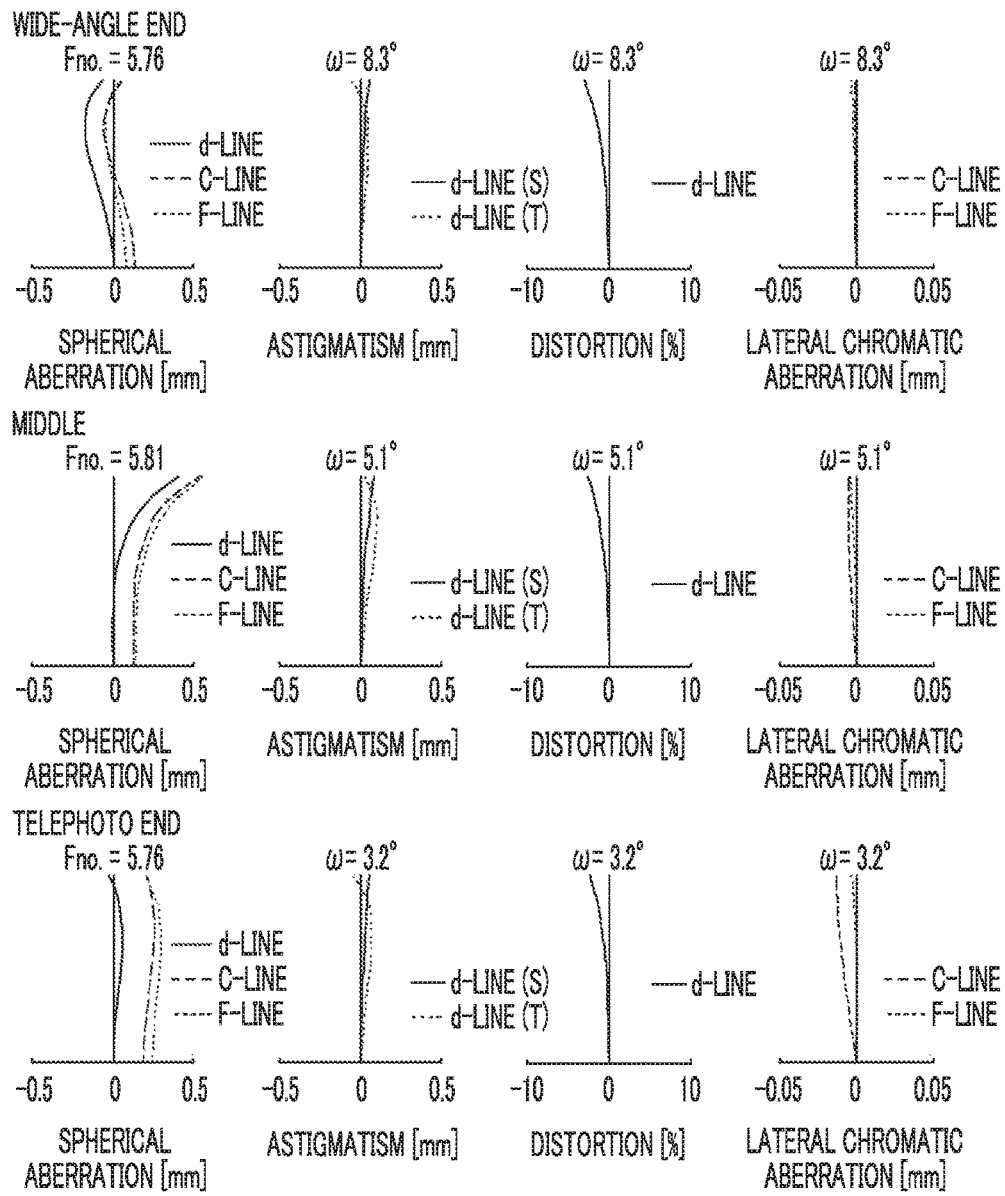
FIG. 11 is an aberration diagram illustrating various aberrations of the rear converter lens (when mounted on the master lens) of Example 4 of the present invention, and shows spherical aberration, astigmatism, distortion, and lateral chromatic aberration, in order from the left side.

Next, the rear converter lens RCL of Example 4 will be described. FIG. 4 shows a cross-sectional view illustrating a lens configuration of the rear converter lens RCL of Example 4. Table 9 shows lens data of the synthetic optical system in which the rear converter lens RCL of Example 4 is mounted on the master lens ML. Table 10 shows data about specification and variable surface distances. Further, FIG. 11 shows aberration diagrams in a state where the rear converter lens RCL of Example 4 is mounted on the master lens ML.

TABLE 9

Example 4

| Si | Ri | Di | Ndj | vdj |
|---|---|---|---|---|
| 1 | 314.4308 | 2.290 | 1.80100 | 34.97 |
| 2 | 80.8630 | 7.400 | 1.49700 | 81.54 |
| 3 | −411.6253 | 0.200 | | |
| 4 | 70.8095 | 7.100 | 1.43875 | 94.94 |
| 5 | ∞ | 0.200 | | |
| 6 | 69.9388 | 5.240 | 1.49700 | 81.54 |
| 7 | 243.2625 | DD[7] | | |
| 8 | 97.3350 | 6.280 | 1.72047 | 34.71 |
| 9 | −44.4430 | 1.540 | 1.62230 | 53.17 |
| 10 | 24.5106 | 5.600 | | |
| 11 | −67.3261 | 1.410 | 1.49700 | 81.54 |
| 12 | 26.8210 | 4.000 | 1.84661 | 23.88 |
| 13 | 128.9145 | 3.130 | | |
| 14 | −31.5622 | 1.200 | 1.91082 | 35.25 |
| 15 | 268.8915 | DD[15] | | |
| 16 | −454.7411 | 2.650 | 1.80100 | 34.97 |
| 17 | −44.3534 | 0.100 | | |
| 18 | 73.4584 | 4.260 | 1.61800 | 63.33 |
| 19 | −43.2070 | 1.170 | 1.80518 | 25.42 |
| 20 | ∞ | DD[20] | | |
| 21(St) | ∞ | 1.300 | | |
| 22 | 27.8674 | 7.050 | 1.49700 | 81.54 |
| 23 | −58.7589 | 0.150 | | |
| 24 | 34.5685 | 2.570 | 1.65412 | 39.68 |
| 25 | 84.5573 | 1.600 | | |
| 26 | −50.7158 | 1.100 | 1.90366 | 31.31 |
| 27 | 23.9830 | 5.210 | 1.49700 | 81.54 |
| 28 | −62.4364 | 2.800 | | |
| 29 | 452.2104 | 3.760 | 1.80518 | 25.42 |
| 30 | −23.3710 | 0.960 | 1.58913 | 61.13 |
| 31 | 39.4316 | 2.480 | | |
| 32 | −40.8960 | 1.000 | 1.80100 | 34.97 |
| 33 | 60.1440 | 3.970 | | |
| 34 | 53.0700 | 5.360 | 1.80000 | 29.84 |
| 35 | −37.6531 | 4.950 | | |
| 36 | 49.5305 | 6.460 | 1.48749 | 70.24 |
| 37 | −26.0930 | 1.310 | 1.80518 | 25.42 |
| 38 | −92.8937 | 4.400 | | |
| 38 | −27.4751 | 1.260 | 1.91082 | 35.25 |
| 40 | −40.9228 | 2.500 | | |
| 41 | 81.3484 | 0.930 | 1.98300 | 4.76 |
| 42 | 21.0000 | 4.710 | 1.62588 | 35.70 |
| 43 | −36.3135 | 2.599 | | |
| 44 | −37.7533 | 0.930 | 1.88300 | 40.78 |
| 45 | 18.9999 | 3.500 | 1.69895 | 30.13 |

TABLE 9-continued

Example 4

| Si | Ri | Di | Ndj | vdj |
|---|---|---|---|---|
| 46 | 785.8116 | 2.151 | | |
| 47 | −35.8502 | 0.930 | 1.77250 | 49.60 |
| 48 | 45.7553 | 6.020 | 1.62004 | 38.26 |
| 49 | −21.5000 | 0.930 | 1.88300 | 40.76 |
| 50 | −118.5501 | 0.200 | | |
| 51 | 28.1920 | 6.625 | 1.54814 | 45.78 |
| 52 | −27.0438 | 1.000 | 2.00089 | 25.46 |
| 53 | −64.4035 | 23.368 | | |
| 54 | ∞ | 2.850 | 1.51880 | 64.20 |
| 55 | ∞ | 0.001 | | |

TABLE 10

Example 4

| | WIDE-ANGLE END | MIDDLE | TELEPHOTO END |
|---|---|---|---|
| ZOOM RATIO | 1.0 | 1.6 | 2.6 |
| cf | −40.048 | −40.048 | −40.048 |
| f | 103.012 | 167.352 | 271.877 |
| Bf | 25.25 | 25.25 | 25.25 |
| FNo. | 5.76 | 5.81 | 5.76 |
| 2ω | 16.6 | 10.2 | 6.4 |
| DD[7] | 1.39 | 19.54 | 31.16 |
| DD[15] | 14.30 | 9.95 | 2.69 |
| DD[20] | 27.99 | 14.19 | 9.82 |

Table 11 shows values corresponding to the conditional expressions (1) to (10) of the rear converter lenses RCL of Examples 1 to 4. It should be noted that, in the above-mentioned examples, the d-line is set as the reference wavelength, and the values shown in the following Table 11 are values at the reference wavelength.

TABLE 11

| EXPRESSION NUMBER | CONDITIONAL EXPRESSION | EXAMPLE 1 | EXAMPLE 2 | EXAMPLE 3 | EXAMPLE 4 |
|---|---|---|---|---|---|
| 1 | cf/f12 | 0.474 | 0.346 | 0.267 | 0.668 |
| 2 | Nnave − Npave | 0.258 | 0.261 | 0.272 | 0.261 |
| 3 | −Σ air/cf | 0.120 | 0.119 | 0.122 | 0.124 |
| 4 | f3/f3a | 0.080 | 0.104 | −0.046 | −0.230 |
| 5 | (1/f12 − 1/f34) × cf | −0.076 | −0.322 | −0.484 | 0.297 |
| 6 | (1/f12 + 1/f34) × cf | 1.025 | 1.015 | 1.017 | 1.040 |
| 7 | f34/f12 | 0.862 | 0.518 | 0.355 | 1.797 |
| 8 | (G3r + G3f)/(G3r − G3f) | 1.267 | 1.088 | 1.287 | 1.867 |
| 9 | (R33r + R33f)/(R33r − R33f) | 1.209 | 1.087 | 1.177 | 1.443 |
| 10 | IH/cf | −0.351 | −0.350 | −0.423 | −0.366 |

As can be seen from the above-mentioned data, all the rear converter lenses RCL of Examples 1 to 4 each have appropriate optical performance with a high zoom ratio, and each have an appropriate back focal length.

Figure 12:
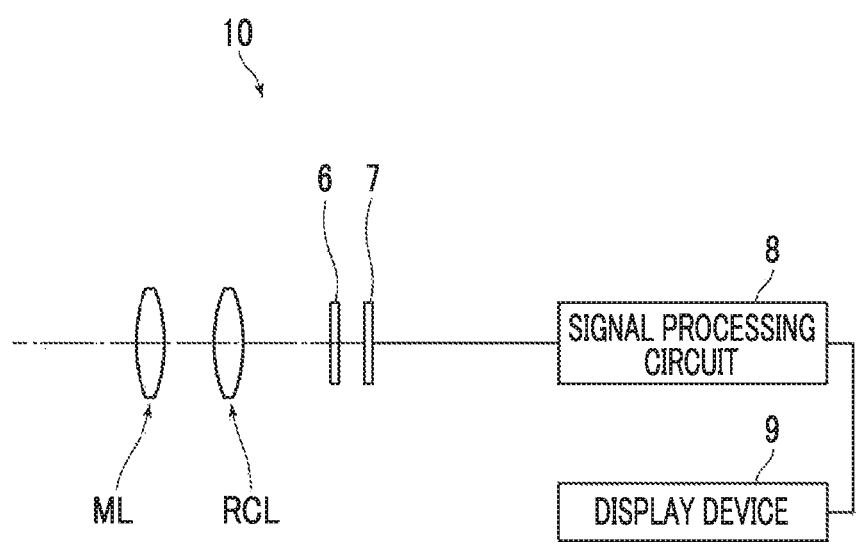
FIG. 12 is a schematic configuration diagram of an imaging apparatus comprising the rear converter lens according to the embodiment of the present invention.

Next, an imaging apparatus 10 according to an embodiment of the present invention will be described. FIG. 12 shows a schematic configuration diagram of the imaging apparatus 10 using the rear converter lens RCL according to the embodiment of the present invention. The related imaging apparatus 10 is a non-reflex digital camera in which the rear converter lens RCL is detachably and attachably mounted on the image side of the master lens ML. It should be noted that, in FIG. 12, each lens group is schematically illustrated.

The imaging apparatus 10 shown in FIG. 12 comprises an imaging lens that is a synthetic optical system including the rear converter lens RCL and the master lens ML, a filter 6 that has a function such as a lowpass filter disposed on the image side of the imaging lens, an imaging element 7 that is disposed on the image side of the filter 6, and a signal processing circuit 8. The imaging apparatus 10 comprises a zoom control unit (not shown in the drawing) that is for performing zooming of the master lens ML, and a focus control unit (not shown in the drawing) that is for performing focusing.

The rear converter lens RCL is detachably and attachably formed on the master lens ML. The imaging element 7 converts an optical image, which is formed through the imaging lens, into an electrical signal. For example, as the imaging element 7, it is possible to use a charge coupled device (CCD), complementary metal oxide semiconductor (CMOS), and the like. The imaging element 7 is disposed such that the imaging surface thereof is coplanar with the image plane of the imaging lens. An image, which is captured through the imaging lens, is formed on the imaging surface of the imaging element 7, an output signal of the image from the imaging element 7 is calculated by the signal processing circuit 8, and the image is displayed on the display device 9. In addition, a zoom operation is performed by moving the second lens group G2 and the third lens group G3 (refer to FIGS. 5 and 6) of the master lens ML in the optical direction through a zoom control unit not shown in the drawing, and a focusing operation is performed through a focus control unit not shown in the drawing.

In the imaging apparatus 10 according to the embodiment of the present invention, a captured image signal corresponding to an optical image, which is formed through the synthetic optical system in which the high-performance rear converter lens RCL and the master lens ML according to the embodiment of the present invention are combined, is output. Therefore, the rear converter lens RCL is appropriately disposed while an increase in apparatus size is suppressed with a high zoom ratio, and it is possible to obtain a photographed image with a high resolution.

The present invention has been hitherto described through embodiments and examples, but the present invention is not limited to the above-mentioned embodiments and examples, and may be modified into various forms. For example, values such as the radius of curvature, the surface distance, the refractive index, and the Abbe number of each lens component are not limited to the values shown in the numerical examples, and different values may be used therefor.

In the embodiment of the imaging apparatus 10, the rear converter lens mounted on the non-reflex digital camera has been described as an example, and the imaging apparatus of the present invention is not limited to this. For example, the rear converter lens of the present invention may be applied to imaging apparatuses such as a video camera, a single-lens reflex camera, a film camera, a movie camera, and a broadcast camera.

EXPLANATION OF REFERENCES

2: rays with maximum angle of view
3: on-axis rays
4: principal ray with maximum angle of view
6: filter
7: imaging element
8: signal processing circuit
9: display device 10: imaging apparatus
G1: first lens group (first lens group included in the master lens)
G2: second lens group (second lens group included in the master lens)
G3: third lens group (third lens group included in the master lens)
G4: fourth lens group (fourth lens group included in the master lens)
L11 to L411: lens
ML: master lens
PP: optical member
RCL: rear converter lens
RG1: first lens group (first lens group included in the rear converter lens)
RG2: second lens group (second lens group included in the rear converter lens)
RG3: third lens group (third lens group included in the rear converter lens)
RG4: fourth lens group (fourth lens group included in the rear converter lens)
RL11: first lens group first lens
RL12: first lens group second lens
RL21: second lens group first lens
RL22: second lens group second lens
RL31: third lens group first lens
RL32: third lens group second lens
RL33: third lens group third lens
RL41: fourth lens group first lens
RL42: fourth lens group second lens
Sim: image plane
St: diaphragm
Z: optical axis

What is claimed is:

1. A rear converter lens that is mounted on an image side of a master lens and has a negative focal length such that a focal length of a whole system thereof is longer than a focal length of the master lens alone, the rear converter lens consisting of, in order from the object side, the following four lens groups:
a first lens group that has a positive refractive power;
a second lens group that has a negative refractive power;
a third lens group that has a negative refractive power; and
a fourth lens group that has a positive refractive power,
wherein the first lens group consists of, in order from the object side, a first lens group first lens which is a negative lens concave toward the image side, and a first lens group second lens which is a positive lens convex toward the object side,
wherein the second lens group consists of, in order from the object side, a second lens group first lens which is a negative lens concave toward the image side, and a second lens group second lens which is a positive lens convex toward the object side,
wherein the third lens group consists of, in order from the object side, a third lens group first lens which is a negative lens concave toward the object side, a third lens group second lens which is a positive lens convex toward the image side, and a third lens group third lens which is a negative lens concave toward the object side,
wherein the fourth lens group consists of, in order from the object side, a fourth lens group first lens which is a biconvex lens, and a fourth lens group second lens which is a negative lens concave toward the object side, and wherein the following conditional expression (1) is satisfied, $$0.22 < cf/f12 < 1 \quad (1),$$

where cf is a focal length of the entire rear converter lens, and
f12 is a composite focal length of the first lens group and the second lens group.

2. The rear converter lens according to claim 1, wherein the following conditional expression (2) is satisfied, $$0.2 < Nnave - Npave < 0.5 \quad (2),$$

where Nnave is an average value of refractive indexes of all the negative lenses included in the rear converter lens at a d-line, and
Npave is an average value of refractive indexes of all the positive lenses included in the rear converter lens at the d-line.

3. The rear converter lens according to claim 1, wherein the following conditional expression (3) is satisfied, $$0.08 < -\Sigma air/cf < 0.14 \quad (3),$$

where $\Sigma air$ is the sum of air distances among surface distances on an optical axis included in the rear converter lens.

4. The rear converter lens according to claim 1, wherein the following conditional expression (4) is satisfied, $$-0.25 < f3/f3a < 1.0 \quad (4),$$

where f3a is a composite focal length of the third lens group first lens and the third lens group second lens, and
f3 is a focal length of the third lens group.

5. The rear converter lens according to claim 1, wherein the following conditional expression (5) is satisfied, $$-0.55 < (1/f12 - 1/f34) \times cf < 0.6 \quad (5),$$

where f34 is a composite focal length of the third lens group and the fourth lens group.

6. The rear converter lens according to claim 5, wherein the following conditional expression (6) is satisfied, $$0.98 < (1/f12 + 1/f34) \times cf < 1.2 \quad (6).$$

7. The rear converter lens according to claim 1, wherein the following conditional expression (7) is satisfied, $$0.3 < f34/f12 < 4 \quad (7),$$

where f34 is a composite focal length of the third lens group and the fourth lens group.

8. The rear converter lens according to claim 1, wherein the following conditional expression (8) is satisfied, $$0.7 < (G3r + G3f)/(G3r - G3f) < 3 \quad (8),$$

where G3r is a paraxial radius of curvature of a most image side surface in the third lens group, and
G3f is a paraxial radius of curvature of a most object side surface of the third lens group.

9. The rear converter lens according to claim 1, wherein the following conditional expression (9) is satisfied, $$0.7 < (R33r + R33f)/(R33r - R33f) < 2 \quad (9),$$

where R33r is a paraxial radius of curvature of an image side surface of the third lens group third lens, and
R33f is a paraxial radius of curvature of an object side surface of the third lens group third lens.

10. The rear converter lens according to claim 1, wherein the third lens group third lens has a meniscus shape.

11. The rear converter lens according to claim 1, wherein in a state where the rear converter lens is mounted on the image side of the master lens, the following conditional expression (10) is satisfied, $$-0.46 < \text{IH}/cf < -0.3 \qquad (10),$$

where IH is a maximum image height.

12. The rear converter lens according to claim 1, wherein the following conditional expression (1-1) is satisfied, $$0.24 < cf/f12 < 0.85 \qquad (1\text{-}1).$$

13. The rear converter lens according to claim 1, wherein the following conditional expression (2-1) is satisfied, $$0.22 < N\text{nave} - N\text{pave} < 0.4 \qquad (2\text{-}1),$$

where Nnave is an average value of refractive indexes of all the negative lenses included in the rear converter lens at the d-line, and
  Npave is an average value of refractive indexes of all the positive lenses included in the rear converter lens at the d-line.

14. The rear converter lens according to claim 1, wherein the following conditional expression (3-1) is satisfied, $$0.1 < \Sigma\text{air}/cf < 0.135 \qquad (3\text{-}1),$$

where Σair is the sum of air distances among surface distances on an optical axis included in the rear converter lens.

15. The rear converter lens according to claim 1, wherein the following conditional expression (4-1) is satisfied, $$0 < f3/f3a < 0.5 \qquad (4\text{-}1),$$

where f3a is a composite focal length of the third lens group first lens and the third lens group second lens, and
  f3 is a focal length of the third lens group.

16. The rear converter lens according to claim 1, wherein the following conditional expression (5-1) is satisfied, $$-0.5 < (1/f12 - 1/f34) \times cf < 0.5 \qquad (5\text{-}1),$$

where f34 is a composite focal length of the third lens group and the fourth lens group.

17. The rear converter lens according to claim 5, wherein the following conditional expression (6-1) is satisfied, $$1 < (1/f12 + 1/f34) \times cf < 1.15 \qquad (6\text{-}1).$$

18. The rear converter lens according to claim 1, wherein the following conditional expression (7-1) is satisfied, $$0.32 < f34/f12 < 3.5 \qquad (7\text{-}1),$$

where f34 is a composite focal length of the third lens group and the fourth lens group.

19. The rear converter lens according to claim 1, wherein the following conditional expression (8-1) is satisfied, $$0.9 < (G3r + G3f)/(G3r - G3f) < 2.5 \qquad (8\text{-}1),$$

where $G3r$ is a paraxial radius of curvature of a most image side surface in the third lens group, and
  $G3f$ is a paraxial radius of curvature of a most object side surface of the third lens group.

20. An imaging apparatus comprising the rear converter lens according to claim 1.

* * * * *